United States Patent
Cho et al.

(10) Patent No.: US 9,999,021 B2
(45) Date of Patent: *Jun. 12, 2018

(54) ELECTRONIC DEVICE AND METHOD OF PROVIDING NOTIFICATION BY ELECTRONIC DEVICE

(71) Applicant: Samsung Electronics Co., Ltd., Gyeonggi-do (KR)

(72) Inventors: Eunbi Cho, Seoul (KR); Hyunjung Park, Gyeonggi-do (KR); Junho Lee, Gyeonggi-do (KR); Jihwa Park, Chungcheongbuk-do (KR); Daehyung Jo, Gyeonggi-do (KR); Dongjin Choi, Gyeonggi-do (KR)

(73) Assignee: Samsung Electroncis Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/662,490

(22) Filed: Jul. 28, 2017

(65) Prior Publication Data

US 2017/0325196 A1 Nov. 9, 2017

Related U.S. Application Data

(63) Continuation of application No. 14/833,633, filed on Aug. 24, 2015, now Pat. No. 9,723,589.

(30) Foreign Application Priority Data

Aug. 29, 2014 (KR) .......................... 10-2014-0114571

(51) Int. Cl.
H04M 3/42 (2006.01)
H04W 68/02 (2009.01)
H04M 1/725 (2006.01)

(52) U.S. Cl.
CPC ....... *H04W 68/02* (2013.01); *H04M 1/72522* (2013.01); *H04M 1/72547* (2013.01);
(Continued)

(58) Field of Classification Search
CPC ............. H04W 68/02; H04M 1/72522; H04M 1/72547; H04M 1/7253; H04M 1/72552; H04M 2250/60
(Continued)

(56) References Cited

U.S. PATENT DOCUMENTS 7,417,650 B1 * 8/2008 Horvitz ................ G06F 9/4443 715/764
8,611,964 B2 * 12/2013 Han .................. H04M 1/72583 455/41.2

(Continued)

FOREIGN PATENT DOCUMENTS

EP 2 391 099 A1 11/2011
KR 10-2014-0095712 A 8/2014

*Primary Examiner* — William Nealon
(74) *Attorney, Agent, or Firm* — Cha & Reiter, LLC

(57) ABSTRACT

A method and electronic device are disclosed herein. The electronic device includes a display and at least one processor. The at least one processor is configured to implement the method, including receiving a first notification for a first application, generating, by at least one processor, a first notification page including at least a part of the first notification, generating an abstract page including a first object related to the first notification and displaying the abstract page on a display, and switching from displaying the abstract page to displaying the first notification page in response to detecting an input signal selecting the first object, wherein the abstract page and the first notification page are generated and displayed based on a same application or home application.

19 Claims, 17 Drawing Sheets

(52) U.S. Cl.
CPC ...... *H04M 1/7253* (2013.01); *H04M 1/72552* (2013.01); *H04M 2250/60* (2013.01)

(58) Field of Classification Search
USPC ...................................................... 455/414.1
See application file for complete search history.

(56) References Cited

U.S. PATENT DOCUMENTS

| | | | |
|---|---|---|---|
| 2010/0058231 A1* | 3/2010 | Duarte .................. | G06F 3/0481 715/800 |
| 2011/0281568 A1* | 11/2011 | Le Clech .............. | H04M 1/575 455/415 |
| 2011/0294549 A1* | 12/2011 | Han .................. | H04M 1/72583 455/566 |
| 2013/0346882 A1* | 12/2013 | Shiplacoff ........... | G06F 3/04842 715/753 |
| 2014/0215494 A1* | 7/2014 | Kim ..................... | G06Q 10/109 719/318 |

* cited by examiner

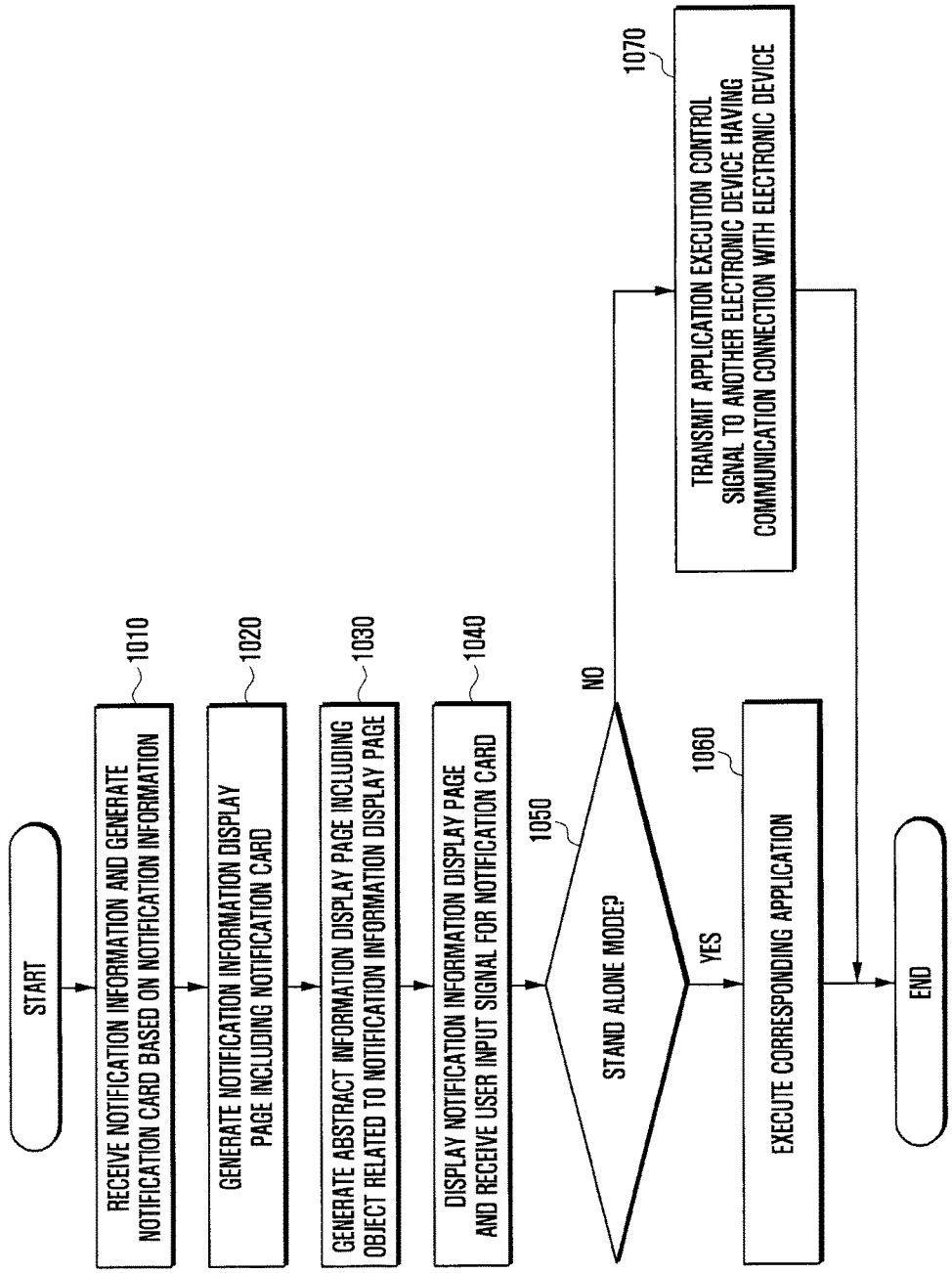

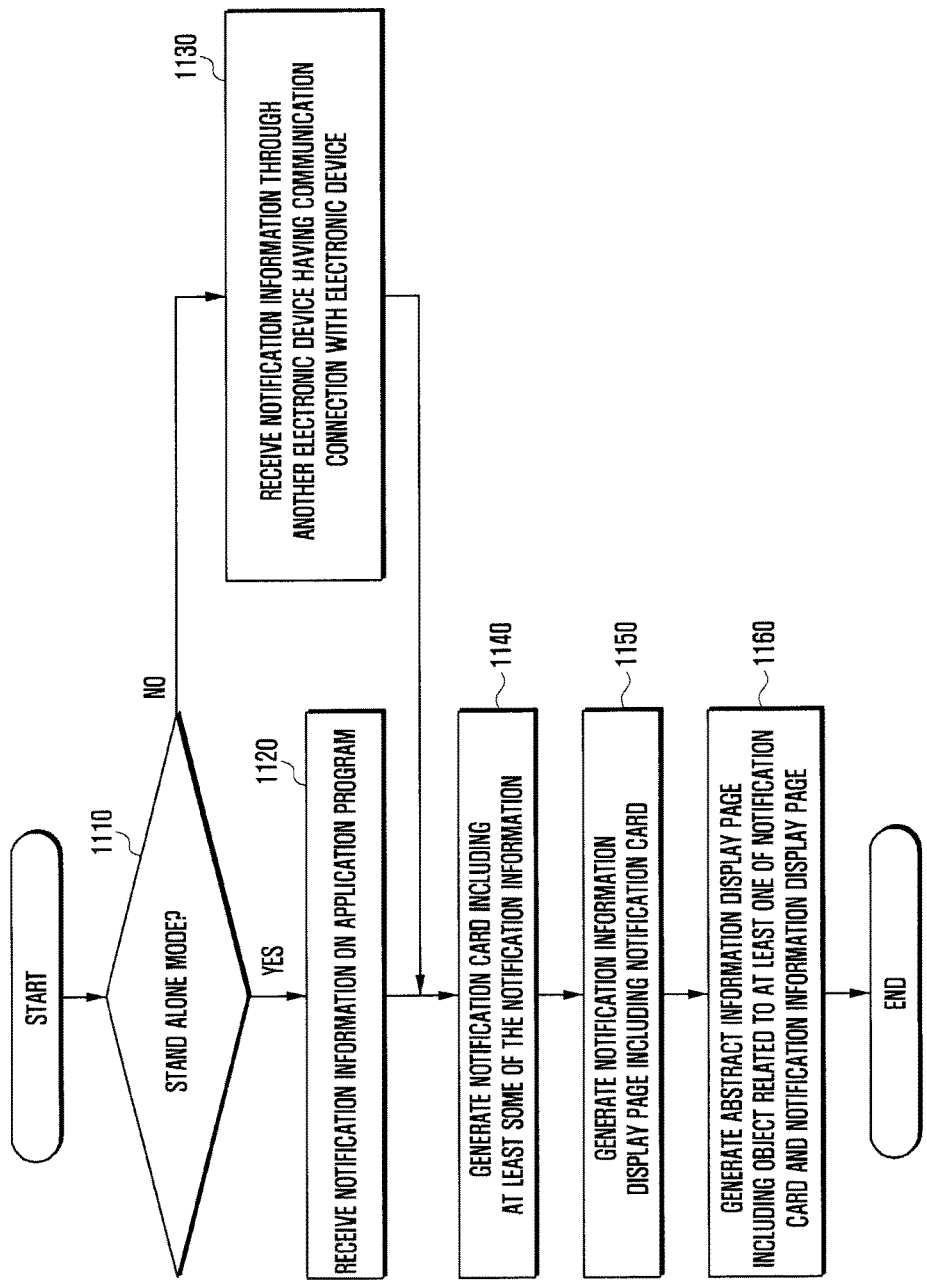

ELECTRONIC DEVICE AND METHOD OF PROVIDING NOTIFICATION BY ELECTRONIC DEVICE

CROSS REFERENCE TO RELATED APPLICATIONS

This application is a Continuation of U.S. patent application Ser. No. 14/833,633 filed on Aug. 24, 2015 which claims priority from and the benefit under 35 U.S.C. § 119(a) of Korean Patent Application No. 10-2014-0114571, filed on Aug. 29, 2014, which is hereby incorporated by reference for all purposes as if fully set forth herein.

TECHNICAL FIELD

The present disclosure relates generally to method of providing notification information.

BACKGROUND

Recent electronic devices have developed into mobile convergence devices, which now include functionality of other devices far beyond their traditional functions. Further, electronic device now include not only devices carried by users, such as a tablet computer or a smart phone, but also various types of wearable devices mountable to a user's body, including a wrist-based smartwatch and/or optical glasses-based electronic devices.

Generally, a wearable device such as a smart watch may execute a communication connection with any terminal (such as, for example, a mobile phone) to receive notification information from the terminal. The notification information may include an SMS text message, email, missed call notification, or various messages generated by a third party app.

SUMMARY

Because wearable devices (such as smart watches) are produced with light and simple designs, wearable devices have a relatively smaller screen compared to a conventional mobile device. Accordingly, when particular notification information is received, it may be difficult for a user to identify a received event, which causes inconvenience due to the smaller screen.

At present, there is no user interface (or "UI") capable of more rapidly and efficiently displaying received notification information so that a user can recognize received data and notifications for various applications at a glance.

In one embodiment of the present disclosure, a method in an electronic device, is disclosed, including receiving a first notification for a first application, generating, by at least one processor, a first notification page including at least a part of the first notification, generating an abstract page including a first object related to the first notification and displaying the abstract page on a display, and switching from displaying the abstract page to displaying the first notification page in response to detecting an input signal selecting the first object, wherein the abstract page and the first notification page are generated and displayed based on a same application or home application.

In another embodiment of the present disclosure, an electronic device is disclosed, including a display, and at least one processor, configured to: receive a first notification for a first application, generate a first notification page including at least a part of the first notification, generate an abstract page including a first object related to the first notification and displaying the abstract page on a display, and control the display to switch from displaying the abstract page to displaying the first notification page in response to detecting an input signal selecting the first object, wherein the abstract page and the first notification page are generated and displayed based on a same application or home application.

Based on a method of providing a notification by an electronic device according to an embodiment of the present disclosure, a user can intuitively view a page including various pieces of notification information and abstract information of the page through one page screen.

Based on a method of providing a notification by an electronic device according to an embodiment of the present disclosure, a user can view the content of notification information through a UI screen without executing a separate application program related to the notification information.

BRIEF DESCRIPTION OF THE DRAWINGS

The above features and advantages of the present disclosure will be more apparent from the following detailed description in conjunction with the accompanying drawings, in which:

FIG. 10 is a flowchart illustrating an operation in which an electronic device executes an application through a notification card according to an embodiment of the present disclosure;

FIG. 11 is a flowchart illustrating an operation in which an electronic device receives notification information according to an embodiment of the present disclosure.

DETAILED DESCRIPTION

Figure 1:
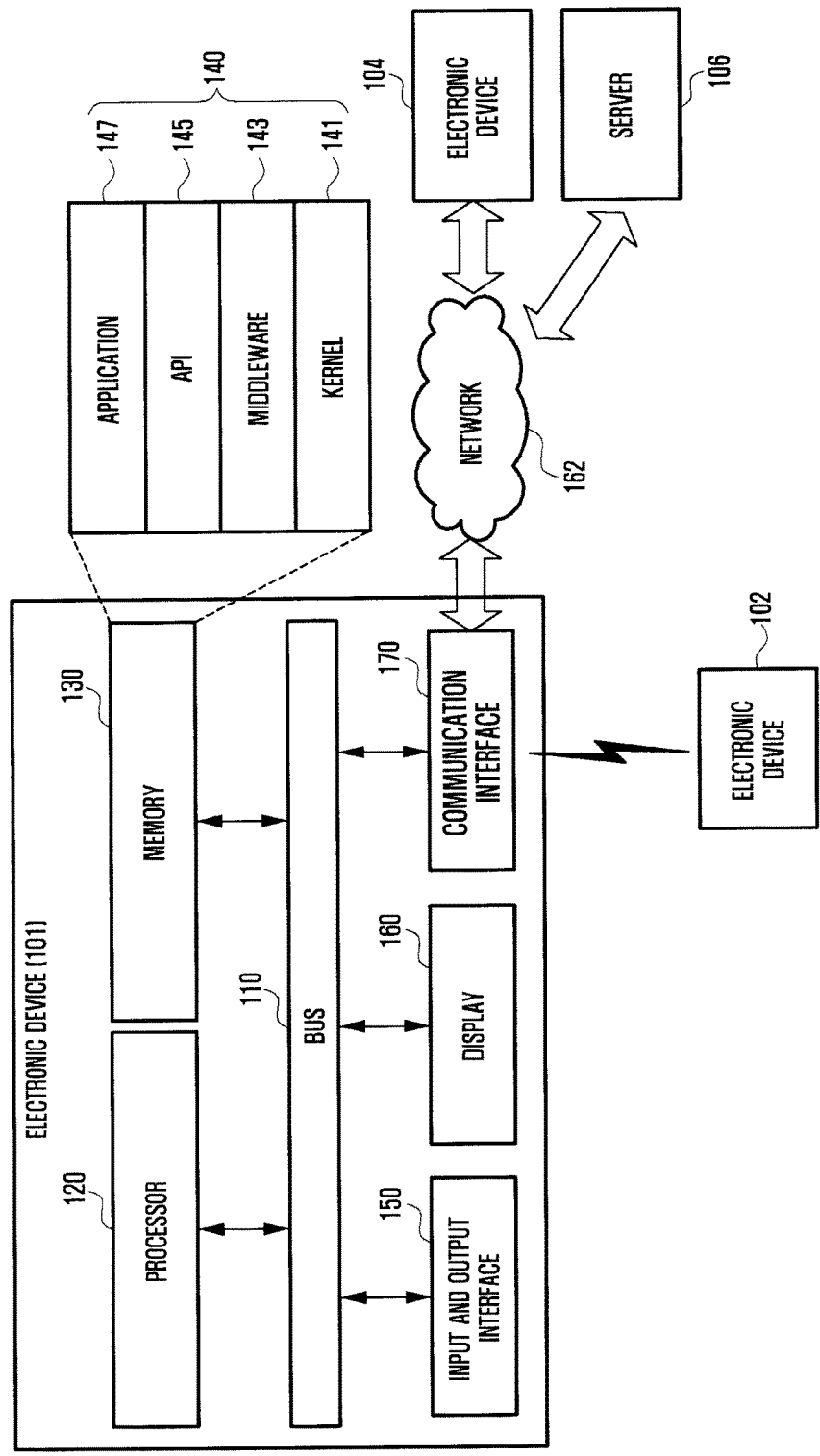
FIG. 1 illustrates a network environment including an electronic device according to an embodiment of the present disclosure.

Hereinafter, example embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the present disclosure.

In the case where a component is referred to as being "connected" or "accessed" to other component, it should be understood that the component does not have to be directly connected or accessed to the other component, but there may exist another component between them. Meanwhile, in the case where a component is referred to as being "directly connected" or "directly accessed" to other component, it should be understood that there is no component therebetween. The terms used in the present disclosure are used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to at least one or a combination of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

Hereinafter, electronic devices according various embodiments of the present disclosure may be described in detail with reference to the accompanying drawings. In the description, the term a 'user' is referred to as a person or an apparatus, e.g., an artificial intelligent electronic device that uses an electronic device.

FIG. 1 illustrates a schematic block diagram of a network environment including an electronic device 101 according to an embodiment of the present disclosure.

The electronic device 101 is capable of generating a notification information page and an abstract information page. The notification information page can provide the user with notifications from identified applications, along with notification card(s) with more specific information from particular notification(s). The applications can include at least one or a combination of cellular telephone, SMS text messages, or email, scheduling alerts, and alarms to name a few. The notification card can include for example and depending on the associated application, the identity of the caller(s), the identity of sender(s) and first few lines of SMS text message(s), the identity of sender(s) and the first few lines of email(s).

The abstract information page includes a listing of each the applications with notifications and the number of the notifications. In certain embodiments, the abstract information page can be displayed on the electronic device 101. This may be particularly convenient if the electronic device 101 has a small screen. The abstract information page may allow the user to navigate the notifications by selecting a particular application with notification(s). Responsive thereto, the electronic device can the notification information page. The notification information page may allow the user to quickly review each notification from the particular application by presentation of the notification cards.

In certain embodiments, the electronic device 101 can be standalone. In other embodiments, the electronic device 101 can include the applications and another electronic device, such as for example, a watch, can display the notification information page and abstract information page. The generation of the notification information page and the abstract information can occur at either the electronic device 101, or responsive to signals from the electronic device 101, at the another electronic device 101. For example, if another electronic device has a small screen, the notification information page and the abstract page can conveniently allow the user to navigate through the notifications.

The electronic device 101 may include a bus 110, a processor 120, a memory 130, an input/output interface 150, a display 160 and a communication interface 170. In an embodiment, the electronic device 101 may omit at least one of the components or may further include at least one component.

The bus 110 may include a circuit that connects the components 110 to 170 to each other and transmits communication data (e.g., control messages and/or data) between the components.

The processor 120 may include one or more of the following: central processing unit (CPU), application processor (AP), and communication processor (CP). The processor 120 may perform operations or process data, related to the controlling and/or communicating function of at least one of the components in the electronic device 101.

The processor 120 may control the entire operation of the electronic device 101 and also the signals flowing between the components. The processor 120 may also perform a data process function. The processor 120 may control the respective components of the electronic device 101 to support a method of securing image data according to an embodiment of the present disclosure. As will be described in greater detail in FIG. 4, the processor 120 can include a notification information receiver for receiving information about notification(s), a notification card generator for generating the notification cards, a page generator for generating the notification information page(s), and the abstract information page, or notification display controller for controlling display of the notification information page(s) or abstract information page(s).

The memory 130 may include volatile memory and/or non-volatile memory. The memory 130 may store instructions or data related to at least one of the other components of the electronic device 101. According to an embodiment, the memory 130 may store software and/or program 140. The program 140 may include, for example, a kernel 141, middleware 143, application programming interface (API) 145, and or application program (shortened to "application") 147. At least part of the API 145, middleware 143, or kernel 141 may be called an operating system (OS).

The memory 130 may store instructions or data transferred from the processor 120 or the other components. The memory 130 may store instructions or data created in the processor 120 or the other components. The program 140 may be configured by software, firmware, hardware, or a combination of at least two or more of them.

The kernel 141 may control or manage system resources (e.g., the bus 110, processor 120, memory 130, etc.) used to execute operations or functions of the other programs (e.g. the middleware 143, API 145, and application program 147). The kernel 141 may also provide an interface that may control or manage system resources, allowing the middleware 143, API 145, and application program 147 to access the respective components of the electronic device 101.

The middleware 143 may make it possible for, for example, the API 145 or application program 147 to perform communication of data with the kernel 141. In addition, in relation to task requests transferred from the application program 147, the middleware 143 may also perform a controlling operation (e.g., scheduling or load balancing) with respect to the task requests by using a method such as a method of assigning the order of priority to use system resources of the electronic device 101 (e.g., the bus 110, processor 120, memory 130, etc.) to at least one application of the application program 147, for example.

The application programming interface (API) 145 is an interface that allows, for example, the application 147 to control functions of the kernel 141 or middleware 143. For example, the API 145 may include at least one interface or function (e.g., command) for file control, window control, video process, or character control, etc. In the present disclosure, The API 145 may include routine information for extracting objects included in corresponding image data from image data.

The input/output interface 150 may transfer instructions or data transferred from, for example, a user or other external devices to the other component (components) of the electronic device 101. In addition, the input/output interface 150 may transfer instructions or data transferred from the other component (components) of the electronic device 101 to a user or other external devices.

The input/output interface 150 may receive numerical or alphabetical information. The input/output interface 150 may include a plurality of input keys and function keys to set various types of functions. The function keys may include direction keys, side keys, shortcut keys, etc., which are set to perform specific functions. The input/output interface 150 may receive keys related to a user's settings and function controls of the electronic device 101, create the key signals, and transfer them to the processor 120. The input/output interface 150 may be implemented in touch screen. A touch screen may be formed with a Liquid Crystal Display (LCD), an Organic Light Emitting Diode (OLED), etc. and may be included in the input/output interface 150. For example, the input/output interface 150 may include a panel, sheet, digitizer or the like that may receive general touch inputs, proximity inputs, gesture inputs, inputs by digital pens, etc.

The display 160 may include, for example, Liquid Crystal Display (LCD) module, Light Emitting Diode (LED) display module, Organic Light Emitting Diode (OLED) display module, Microelectomechanical Systems (MEMS) display module or electronic paper display module. The display 160 may display, for example, various contents (e.g., text, images, videos, icons, symbols, etc.) for the user. The display 160 may include a touch screen and may receive touches, gestures, proximity inputs or hovering inputs by using, for example, a digital pen or a part of a user's body.

The display 160 may provide various screens according to the use of the electronic device 101, e.g., screen interfaces related to standby screens, menu screens, call screens, etc. When the display 160 is implemented in touch screen, the screen of the display 160 may serve as the input/output interface 150. Additionally, in certain embodiments, the display 160 can display notification information page(s) and an abstract information page. For example, in embodiments where the display 160 is small in size configuration to display the notification information pages and the abstract information page allows a user to more easily navigate application notifications.

The communication interface 170 may establish communication between, for example, the electronic device 101 and an external device (e.g., a first external electronic device 102, a second external electronic device 104 or a server 106). For example, the communication interface 170 may communicate with the external device (e.g., second external electronic device 104 or server 106) connected to the network 162 in wireless or wired communication mode. Alternatively, the electronic device 101 may communication directly with electronic device 102. For example, electronic device 101 may communication directly with electronic device 102 using Bluetooth.

The wireless communication may use at least one of the following: for example, LTE, LTE-A, CDMA, WCDMA, UMTS, Wi-Bro, GSM, etc., as cellular communication protocols, for example. The wired communication may include at least one of the following: for example, universal serial bus (USB), high definition multimedia interface (HDMI), recommended standard 233 (RS-232), plain old telephone service (POTS), etc. The network 162 may include at least one of the following: telecommunication networks, e.g., a computer network (for example, LAN or WAN), or telephone networks.

The communication interface 170 may establish communication with other electronic devices or a server which are connected to the electronic device 101 through the network, and may perform transmission/reception of data. The communication interface 170 may include, for example, a cellular module, a Wi-Fi module, a BT module, a GPS module, an NFC module, a mobile network module, or a radio frequency (RF) module.

The first and second external electronic devices 102 and 104 may each be identical or different in type to or from the electronic device 101. According to an embodiment, the server 106 may include one or more groups of servers. According to various embodiments, part of all of the operations executed in the electronic device 101 may be executed in another electronic device or a plurality of other electronic devices (e.g., electronic devices 102 and 104, server 106). According to an embodiment, when the electronic device 101 needs to perform a function or service automatically or according a request, it does not execute the function or service and may additionally request at least part of the function related the execution from other devices (e.g., electronic devices 102 and 104, server 106). The other electronic devices (e.g., electronic devices 102 and 104, server 106) may execute the requested function or additional function and transmit the executed result to the electronic device 101. The electronic device 101 may process the received result as it received or with additional processes and may provide the requested function or service. To this end, the embodiment may employ, for example, cloud computing, distributed computing, or client-server computing technique.

Figure 2:
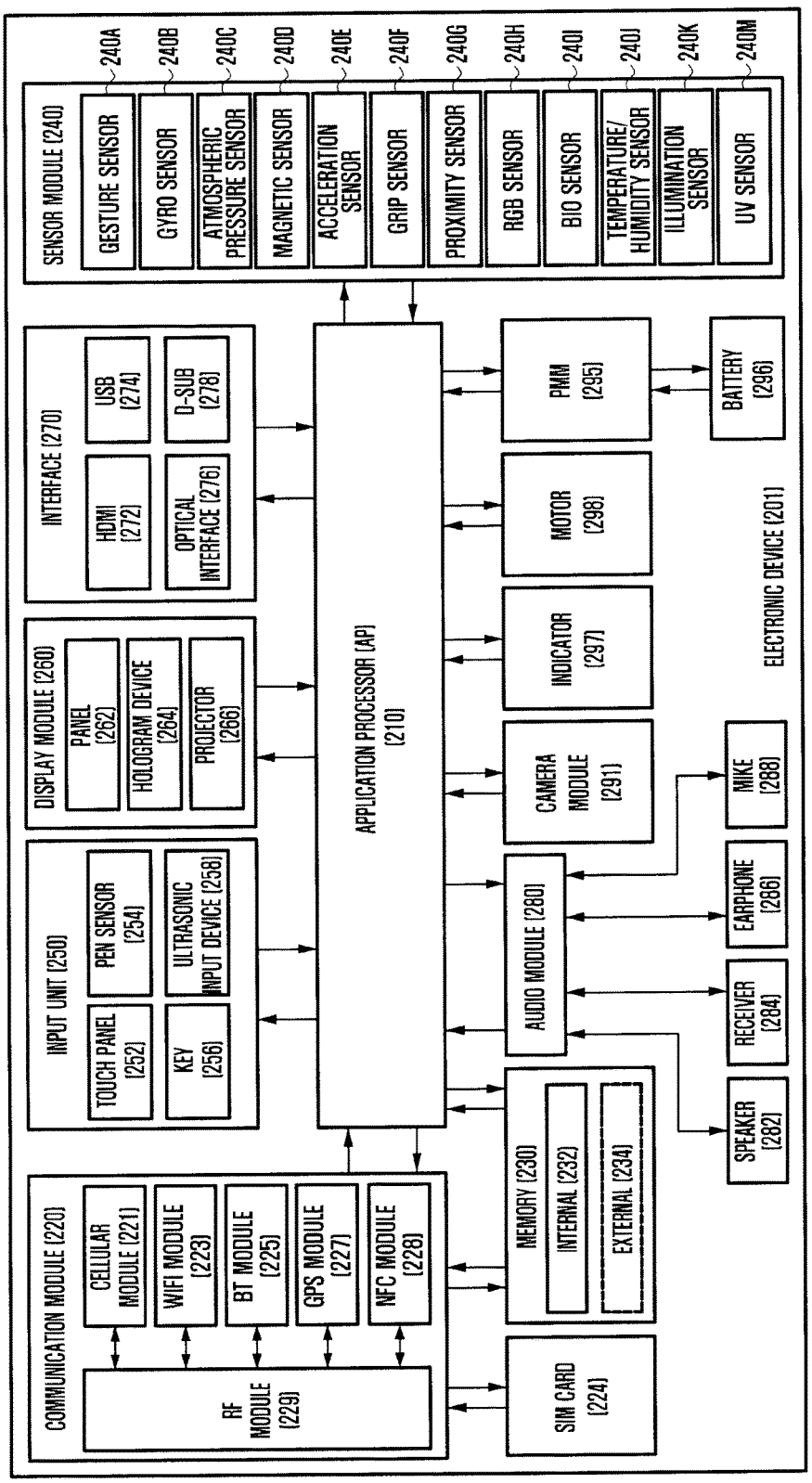
FIG. 2 is a block diagram of an electronic device according to various embodiments of the present disclosure.

In certain embodiments, electronic device 101 can include the applications and electronic device 102 or 104 can display the notification information page and abstract information page. The generation of the notification information page and the abstract information can occur at either the electronic device 101, or responsive to signals from the electronic device 101, at the electronic device 102 or 104. For example, if the electronic device 102 or 104 is a watch with a small screen, the notification information page and the abstract page can conveniently allow the user to navigate through the notifications. FIG. 2 is a block diagram illustrating an electronic device 200 in accordance with an embodiment of the present disclosure. The electronic device 200 may form, for example, the whole or part of the electronic device 101 shown in FIG. 1. Referring to FIG. 2, the electronic device 200 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown). For example, AP 210 may drive the applications that issue notifications. When an application issues a notification, the AP 210 may generate notification information page(s) and abstract information pages through, for example, the GPU.

The communication module 220 (e.g., the communication interface 170) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229. In certain embodiments, the communication module 220 may communication application notifications, notification information page(s), or an abstract information page to another electronic device 102 or 104

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory. Additionally, the AP 210 or the CP 221 can cause a notification information page indicating a phone call application and notifications of either an incoming or missed call.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device. The SIM card 224 may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, or a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 160) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 150 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired or wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
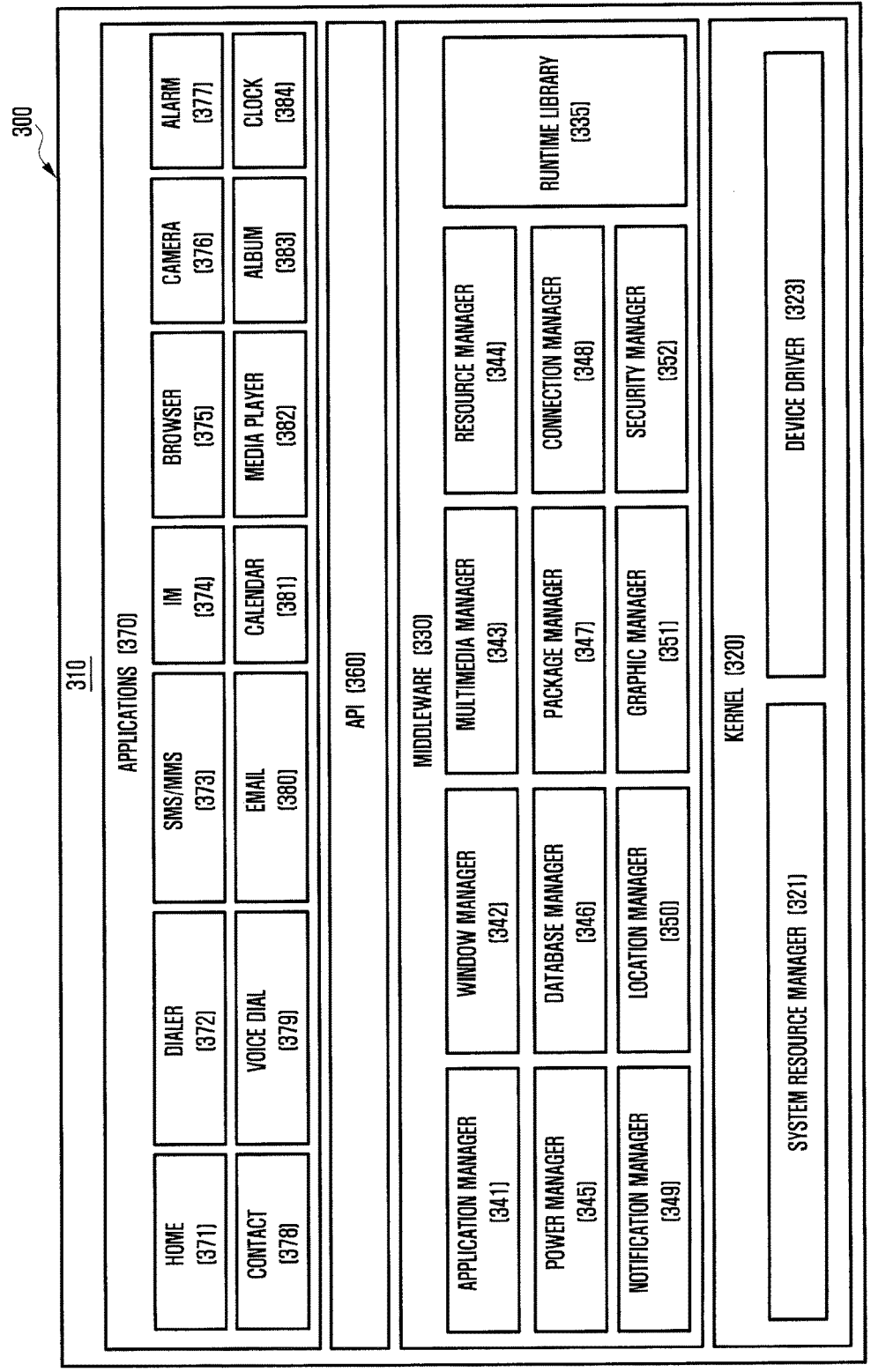
FIG. 3 is a block diagram of a program module according to various embodiments of the present disclosure.

FIG. 3 is a block diagram illustrating a configuration of a programming module 310 according to an embodiment of the present disclosure.

The programming module 310 may be included (or stored) in the electronic device 101 (e.g., the memory 130) or may be included (or stored) in the electronic device 200 (e.g., the memory 230) illustrated in FIG. 1. At least a part of the programming module 310 may be implemented in software, firmware, hardware, or a combination of two or more thereof. The programming module 310 may be implemented in hardware (e.g., the electronic device 200), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 300 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or any other suitable and/or similar manager.

The runtime library 335 may include, for example, a library module used by a compiler, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. In certain embodiments of the present disclosure, the events from the notification manager may cause generation of notification information pages and an abstract information page. For example, the notification manager 349 can, itself, or in connection with graphic manager create notification information page(s) and an abstract information page. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

In certain embodiments, any one of the SMS/MMS application 373, IM application 374, alarm application 377, email application 380, calendar application 381 can issue notifications that are the subject of notification information page(s), and the abstract information page.

In certain embodiments, the home application 371 can generate the notification information pages and the abstract information page. The home application 371 can either receive notifications directly from the applications, or the notification manager 349.

At least a part of the programming module 310 may be implemented by instructions stored in a non-transitory computer-readable storage medium. When the instructions are executed by one or more processors (e.g., the one or more application processors 210), the one or more processors may perform functions corresponding to the instructions. The non-transitory computer-readable storage medium may be, for example, the memory 230. At least a part of the programming module 310 may be implemented (e.g., executed) by, for example, the one or more application processors 210. At least a part of the programming module 310 may include, for example, a module, a program, a routine, a set of instructions, and/or a process for performing one or more functions.

Names of the elements of the programming module (e.g., the programming module 310) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

Figure 4:
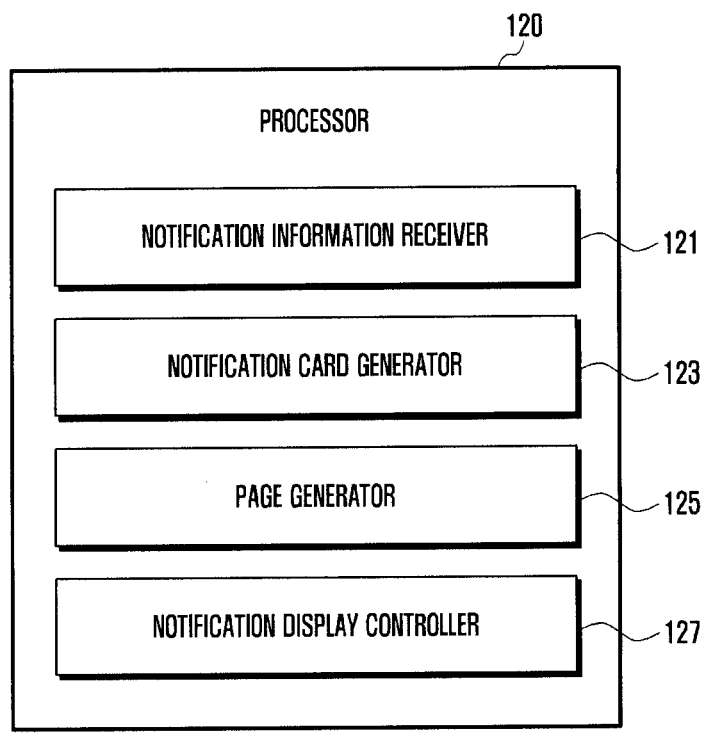
FIG. 4 is a block diagram of a processor according to an embodiment of the present disclosure.

FIG. 4 is a detailed block diagram of the processor 120 according to an embodiment of the present disclosure.

The processor 120 may include a notification information receiver 121, a notification card generator 123, a page generator 125, or a notification display controller 127.

The notification information may include image or text information such as a message, email, time, and date related to various applications. The notification card may be a template or panel type UI including some or all of pieces of the notification information. The notification card may include at least some pieces of the notification information. For example, the notification card may be a UI, which implements some or all pieces of the notification information by various types of layout, color, frame, and font. The page (notification information display page or abstract information display page) may be a UI screen to be displayed on the display 160 of the electronic device 101.

The notification information receiver 121 may receive notification information of a program. The program may include an application program. For example, the program may include various applications such as a home application included in the electronic device 101 or a third party application. The notification information receiver 121 may receive notification information of an application from an external device (another electronic device 102 or 104, the server 106, or cloud) through the communication interface 170.

According to an embodiment, the notification information receiver 121 may receive notification information from the electronic device 104 or the server 106 through the network 162. The electronic device 101 may differently receive notification information in a case where the electronic device 101 operates in a stand alone mode and a case where the electronic device 101 does not operate in the stand alone mode. A detailed description for reception of the notification information according to the stand alone mode will be described below.

According to an embodiment, the notification information receiver 121 may receive at least a part of pieces of the notification information of the application. For example, the notification information receiver 121 may make a request for some pieces of the notification information to the application. Some pieces of the notification information may be information requested for generating the notification card. Further, the notification information receiver 121 may receive all pieces of the notification information of the application. The notification information receiver 121 may transmit some or all pieces of the notification information to the notification card generator 123, the notification card generator 123 may process the received notification information. The notification information receiver 121 may store the received notification information of various applications in the memory 130 or a cache memory.

The notification card generator 123 may process some or all pieces of the notification information received from the notification information receiver 121. For example, the notification card generator 123 may process the notification information to be suitable for a predetermined notification card size, layout, color, and font. The notification card generator 123 may generate the notification card based on the processed notification information. For example, the notification card generator 123 may insert the processed notification information into a preset notification card layout to generate the notification card. According to an embodiment, the notification card generator 123 may load the notification information stored in the memory 130 or the cache memory. The notification card generator 123 may process the loaded notification information and generate the notification card by using the processed notification information.

According to an embodiment, the notification card generator 123 may store at least one of the processed notification information or the notification card in the memory 130 or the cache memory.

The page generator 125 may recognize reception of the notification information through the notification information receiver 121 or the notification card generator 123.

According to an embodiment, the page generator 125 may generate a notification information display page to be displayed on the display 160 according to the received notification information. The notification information display page may be a page included in one or more notification cards according to the notification information received by a particular application. The page generator 125 may generate a first notification information display page, a second notification information display page, or an nth notification information display page according to an order of the received notification information. The reception by the particular application may refer to a particular category of the notification information. For example, when notification information of an email application is received, the notification information display page may refer to a page screen corresponding to the email category.

The page generator 125 may generate the notification information display page by adding a notification card into a preset page layout. Further, the page generator 125 may add the notification card into the previously generated notification information display page. The page generator 125 may generate or change various sizes of pages according to the content and number of notification cards. The page generator 125 may transmit the generated page to the display 160 or store the generated page in the memory 130 or a cache memory.

According to an embodiment, the page generator 125 may generate a plurality of notification information display pages by receiving a plurality of pieces of notification information. The page generator 125 may determine whether the type of newly received notification information is the same as the type of previously received notification information. The number of pieces of the previously received notification information may be plural. In order to determine whether the types of the pieces of the notification information are the same, the page generator 125 may determine whether the newly received notification information or the previously received notification information is the notification information of the same application. For example, when the previously received notification information is the notification information related to the mail application and the newly received notification information is also the notification information related to the same mail application, the page generator 125 may determine that the previous notification information and the new notification information are the same as each other. According to the present disclosure, a first application and a second application may be different from each other.

When it is determined that the type of the newly received notification information is the same as the type of at least one piece of the received notification information, the page generator 125 may add the new notification card into the previous notification information display page without generating the notification information display page.

When the type of the newly received notification information is different from the type of the previously received notification information, the page generator 125 may additionally generate the notification information display page. For example, when the previously received notification information is the information related to the mail application and the newly received notification information is information related to an application notifying of a missed call, the page generator 125 may determine that the previous notification information and the new notification information are different from each other. In this case, the page generator 125 may generate a new notification information display page related to the missed call.

According to an embodiment, the page generator 125 may generate an abstract information display page. The abstract information display page may be UI screen that guides the generation of one or more notification information display pages. The page generator 125 may generate objects for one or more notification information display pages and add the generated objects into the abstract information display pages. The object may be an icon, which can briefly display abstract information on the notification information display page or a list type UI including the icon. For example, when the notification information display page is an email-related page, the page generator 125 may generate a text, emoticon, or image related to the email as the object. The page generator 125 may generate the object in a list panel form and add the generated object into the abstract information display page.

According to an embodiment, the page generator 125 may add link information or tag information related to one or more notification information display pages. When the abstract information display page including the object is displayed, the processor 120 may receive a user input signal of the object and display one or more notification information display pages based on the like information or the tag information. For example, when the processor 120 receives the user input signal of the object, the processor 120 may display a previously generated notification information display page without executing a separate application based on the link information.

According to an embodiment, the page generator 125 may store one or more generated or changed notification information display pages, the abstract information display page, the object, or the link information in the memory 130 or the cache memory.

The notification display controller 127 may display the abstract information display page or one or more notification information display pages on the display 160 according to a user input signal or driving of the electronic device 101. For example, the notification display controller 127 may load the abstract information display page or the one or more notification information display page stored in the memory 130 or the cache memory. The notification display controller 127 may transmit the loaded abstract information display page or one or more notification information display pages to the display 160.

According to an embodiment, the notification information receiver 121, the notification card generator 123, or the page generator 125 may be implemented by a home application. For example, the electronic device 101 may implement a home (idle) screen displayed when the system is driven, the abstract information display page, and one or more notification information display pages by a home process.

The electronic device 101 according to an embodiment of the present disclosure may include: a display; and a processor for receiving notification information on a first application, generating a first notification information display page including at least some of the notification information, generating a first object related to the notification information and an abstract information display page including the first object, displaying the abstract information display page on a display, and displaying the first notification information display page based on a user input signal for the first object, where the generating of the abstract information display page and the first notification information display page may be performed based on an equal application or home application.

In the electronic device 101 according to an embodiment of the present disclosure, the processor 120 may additionally receive notification information on a second application different from the first application, and add a second object related to the notification information on the second application to the abstract information display page and display the abstract information display page on the display 160.

In the electronic device 101 according to an embodiment of the present disclosure, the processor 120 may generate a second notification information display page including at least some of the notification information related to the second application, receive a user input signal for the second object on the abstract information display page through the display 160, and display the second notification information display page on the display 160 based on the user input signal for the second object, and the generating and displaying of the first notification information display page, the second notification information display page, and the abstract information display page may be performed based on an equal application or home application.

In the electronic device 101 according to an embodiment of the present disclosure, the processor 120 may display each of the first object and the second object in a particular position of a display screen based on a predetermined condition. In the predetermined condition, the newly displayed second object may be displayed above the conventionally displayed first object on a screen of the display 160. However, the present disclosure is not limited thereto, and other various conditions may be configured according to a user or a designer.

In the electronic device 101 according to an embodiment of the present disclosure, the processor 120 may additionally receive one or more pieces of notification information of the first application, add the one or more pieces of additionally received notification information to the first notification information display page, and further display, on the display 160, the one or more pieces of additionally received notification information on the first notification information display page based on a predetermined user input signal.

In the electronic device 101 according to an embodiment of the present disclosure, at least some of the notification information may be displayed as an image screen in a particular area of the first notification information display page, and the processor 120 may control the display to differently display the numbers or sizes of image screens corresponding to the one or more pieces of notification information on the first notification information display page based on the user input signal. For example, when a variable input signal such as a pinch zoom input signal for the first notification information display page is received, the electronic device 101 may control the number and size of image screens included in the first notification information display page. The image screen may be, for example, a notification card.

In the electronic device 101 according to an embodiment of the present disclosure, the processor 120 may receive user input signal for executing the first application on the first notification information display page and execute the first application based on the user input signal.

In the electronic device 101 according to an embodiment of the present disclosure, the processor 120 may determine whether the electronic device 101 is in a stand alone mode, and execute the first application when the electronic device 101 is in the stand alone mode or transmit a first application execution control signal to another electronic device connected to the electronic device 101 when the electronic device 101 is not in the stand alone mode.

In the electronic device 101 according to an embodiment of the present disclosure, the processor 120 may determine whether the electronic device 101 is in a stand alone mode, and receive the notification information on the first application embedded in the electronic device 101 when the electronic device 101 is in the stand alone mode or receive notification information from another electronic device 102 or 104 connected to the electronic device 101 when the electronic device 101 is not in the stand alone mode.

Figure 5:
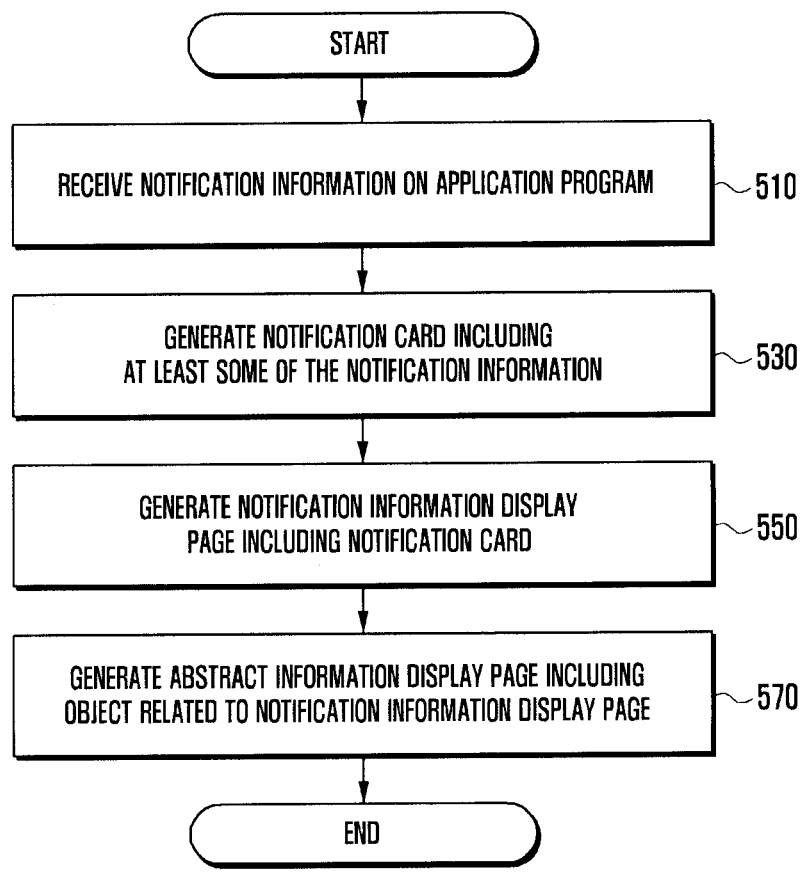
FIG. 5 is a flowchart illustrating an operation in which an electronic device generates a notification card and a page according to an embodiment of the present disclosure.

FIG. 5 is a flowchart illustrating an operation in which the electronic device 101 generates a notification card (such as by notification card generator 123) and a page (such as by page generator 125) according to an embodiment of the present disclosure.

According to an embodiment, in operation 510, the electronic device 101 may receive notification information related to a program. The program may include an application program such as one of applications 370. For example, the notification information receiver 121 may receive notification information from an external device (such as, for example, the electronic device 102 or 104, or the server 106) through the network 162 or the communication interface 170.

According to an embodiment, in operation 530, the electronic device 101 may generate a notification card including at least some of the notification information. For example, the notification card generator 123 may generate the notification card based on the notification information received from the memory 130 or the notification information receiver 121.

The notification card generator 123 may generate the notification card regardless of whether a type of newly received notification information is the same as a type of previously received notification information. In the notification information, notification information of the same type may include different content. For example, although a plurality of mail items for a mail application are received, each mail item may have different senders, time of receipt, and message content. Accordingly, the notification card generator 123 may generate the notification card whenever the notification information is received, regardless of the type of notification information.

According to an embodiment, in operation 550, the electronic device 101 may generate a notification information display page including the notification card. The page generator 125 may generate the notification information display page based on the notification card received from the memory 130 or from the notification card generator 123.

According to an embodiment, in operation 570, the electronic device 101 may generate an abstract information display page including an object related to at least one of the notification card or the notification information display page. For example, the page generator 125 may generate an object related to the generated notification information display page. The page generator 125 may generate an abstract information display page including the object. The page generator 125 may generate the object and the abstract information display page together or separately. For example, when initial notification is received, the page generator 125 may generate the object together with the abstract information display page. Thereafter, when reception of notification information is added, the page generator 125 may generate a new object based on the newly generated notification information display page. The page generator 125 may add the newly generated object to the abstract information display page.

According to an embodiment, when the electronic device 101 receives initial notification information, the page generator 125 may generate the notification information display page or the abstract information display page based on the notification card information. For example, when the initial notification information is received, the processor 120 may generate one notification card, one notification information display page, and one abstract information display page by default.

According to an embodiment, the electronic device 101 may store the notification card, the notification information display page, the abstract information display page, the object, or the link information in the memory 130 or the cache memory. The electronic device 101 may store various pieces of data created during a process of generating the notification card, the notification information display page, the abstract information display page, the object, or the link information in the memory 130 or the cache memory.

Figure 6:
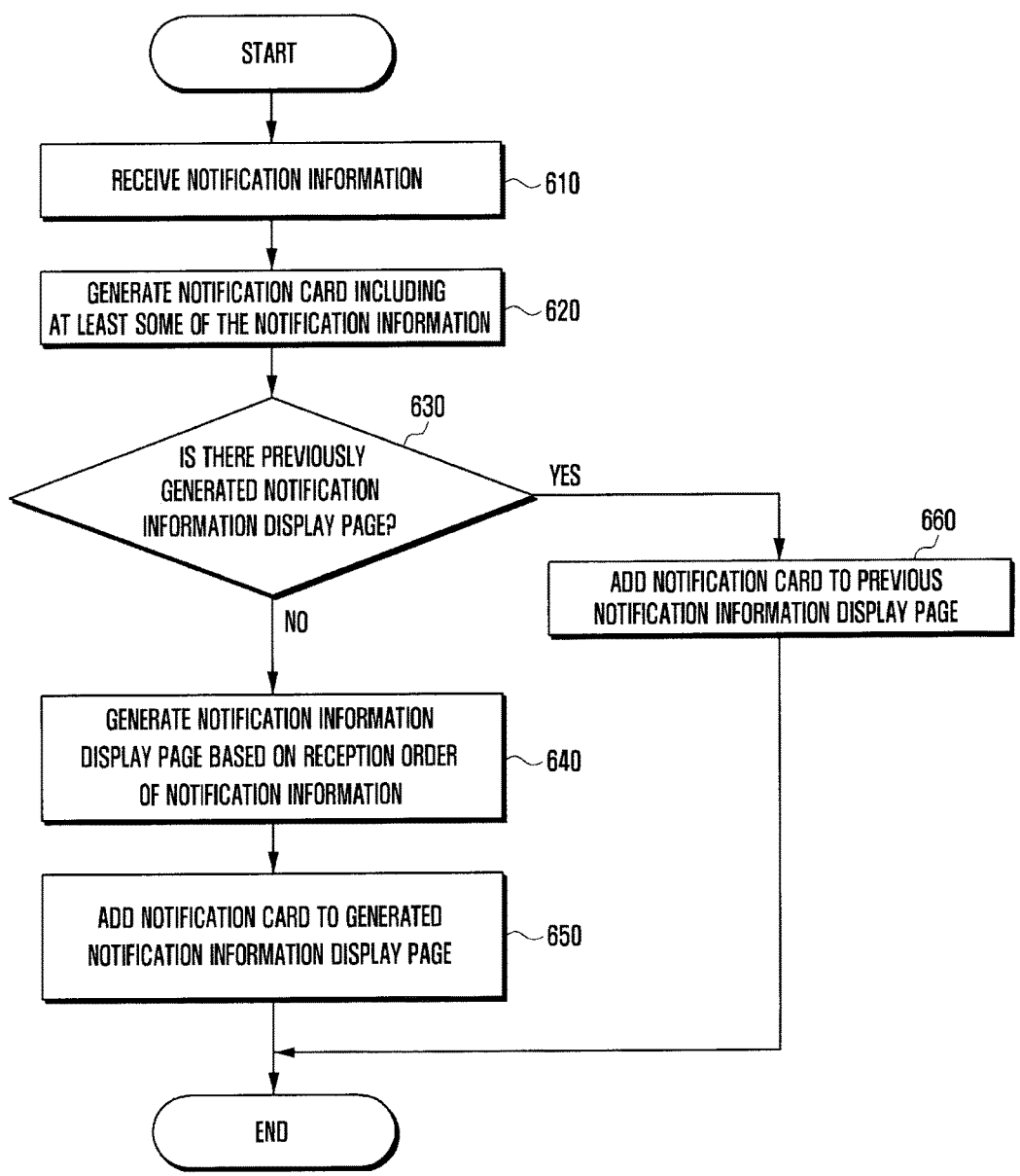
FIG. 6 is a flowchart illustrating an operation in which an electronic device generates a page by adding reception of notification information according to an embodiment of the present disclosure.

FIG. 6 is a flowchart illustrating an operation in which the electronic device 101 generates a page by adding reception of notification information, according to an embodiment of the present disclosure. Regarding the following description of FIG. 6, subject matter which has already been described in FIG. 5 may be omitted.

According to an embodiment, in operation 610, the electronic device 101 may receive notification information. For example, the notification information receiver 121 may receive notification information of various applications.

According to an embodiment, in operation 620, the electronic device 101 may generate a notification card including at least some of the notification information.

According to an embodiment, in operation 630, the electronic device 101 may determine whether there is a previously generated notification information display page. For example, the page generator 125 may determine whether the type of received notification information is the same as the type of previously received notification information. The page generator 125 may determine whether the received notification information and the previously received notification information correspond to notification information related to the same application.

When there is the previously generated notification information display page, the electronic device 101 may add the notification card to the previous notification information display page in operation 660. For example, when the received notification information and the previously received notification information correspond to notification information of the same application, the page generator 125 may add the newly generated notification card to the previously generated notification information display page.

When there is no previously generated notification information display page, the electronic device 101 may generate a new notification information display page in operation 640. According to an embodiment, the electronic device 101 may generate the notification information display page according to a reception order of the notification information. For example, when the page generator 125 generates a plurality of notification information display pages according to a plurality of pieces of notification information, the page generator 125 may determine positions where the plurality of notification information display pages are generated. The positions where the notification information display pages are generated may refer to positions where a plurality of pages to be displayed on the display of the electronic device 101 are arranged in one virtual canvas. For example, the page generator 125 may generate the notification information display page or the abstract information display page in one notice board. The notice board may be, for example, a virtual canvas in which the notification information display page or the abstract information display page may be arranged within a predetermined space. The notice board may be a predetermined logical area. Methods for arranging pages in the notice board may be variously implemented as desired. The page generator 125 may output or otherwise display the notification information display page or the abstract information display page generated in the notice board according to or in response to a page call signal. The page generator 125 may generate a plurality of notification information display pages in at least one direction based on the generated abstract information display page. According to an embodiment, the page generator 125 may generate the notification information display page such that a newly received notification information display page is located in a position adjacent to the abstract information display page. For example, when one or more notification information display pages are generated in a left direction of the abstract information display page, a lastly received notification information display page may be a left page adjacent to the abstract information display page. When a page call signal is received from the user, the processor 120 may display an order of screens to be displayed on the display according to the arrangement order generated on the notice board based on the above described page generation arrangement. For example, when the electronic device 101 receives a swipe input signal from the left to the right in a home screen (e.g., an idle clock), the electronic device 101 may display pages in accordance with the pages arranged on the notice board. For example, when a first notification information display page, a second notification information display page, an abstract information display page, and a home screen are sequentially arranged and generated from the left side of the notice board, the electronic device 101 may output the abstract information display page according to reception of an input signal for movement from the home screen of the display to a left page.

According to an embodiment, in operation 650, the electronic device 101 may add the notification card into the generated notification information display page. According to another embodiment, the page generator 125 may receive the notification card from the notification card generator 123 and generate the notification information display page including the notification card.

FIGS. 7A to 7D may further illustrate examples of the operation described thus far with reference to at least FIGS. 5 and 6.

Figure 7A:
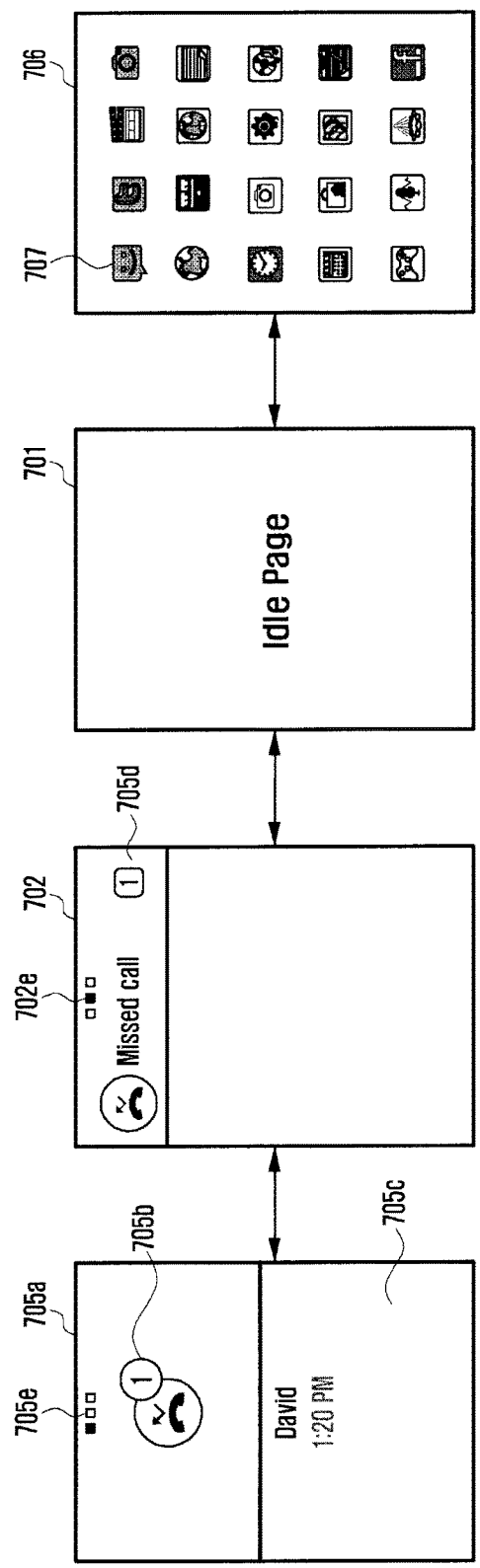
FIG. 7A, FIG. 7B, FIG. 7C and FIG. 7D illustrate examples of the operation of FIG. 6.

FIG. 7A illustrates an operation for generating a notification card and a page according to initial notification information reception. The electronic device 101 may generate one notification information display page 705a (such as during operations 550 and 640) and one abstract information display page 702 (such as during operation 570) when the initial notification information is received. An idle page 701 may be a page generated by default when the electronic device 101 is driven. Further, the electronic device 101 may generate an application menu page 706 in the right side of the idle page 701. The application menu page 706 may include at least one application icon 707. The application menu page 706 may be also generated by default by the electronic device 101. The electronic device 101 may simultaneously generate the notification information display page 705a, the abstract information display page 702, the idle page 701, and the application menu page 706. For example, the electronic device 101 may generate the notification information display page 705a, the abstract information display page 702, the idle page 701, and the application menu page 706 through one process. For example, the electronic device 101 may generate at least one of the abstract information display page 702, the notification information display page 705a, the idle page 701, and the application menu page 706 through the home process. The electronic device 101 may automatically load at least one piece of stored information among the generated abstract information display page 702, notification information display page 705a, idle page 701, and application menu page 706 from the memory 130 when power is driven.

The notification information display page 705a may include category information 705b or a notification card 705c. The electronic device 101 may generate the category information 705b and the notification card 705c initially generated on the notification information display page 705a. The category information may include, for example, the type of each application or relative position information on the page to be displayed on the display among one or more pages. The electronic device 101 may generate page indicators 705e and 702e to distinguish relative position information on each page. The electronic device 101 may generate each page indicator 705e or 702e, the notification information display page 705a, or the abstract information display page 702.

When the initial notification information is received, the electronic device 101 may generate the first notification card 705c, the first notification information display page 705a, or the abstract information display page. As illustrated in FIG. 7A, the electronic device 101 may receive the initial notification information of an application indicating the existence of a missed call. The electronic device 101 may receive the initial notification information for the missed call notification application preloaded in the electronic device 101, or the external electronic devices 102 or 104. As the missed call notification information is initially received, the electronic device 101 may generate count information (number "1") indicating that there is one missed call in the first category information 705b. The count information may be generated as a UI item. Because of the generation of the first notification information display page 705a, the abstract information display page 702, and the idle page 701, the electronic device 101 may generate the page indicator 705e indicating a total of three pages. The first notification information display page 705a is located or arranged to be a leftmost page of the three pages, so the electronic device 101 may generate the page indicator 705e to indicate that the first notification information display page 705a is the first or leftmost page.

The electronic device 101 may generate the abstract information display page 702 simultaneously or sequentially with the generation of the first notification information display page 705a. According to the initial notification information, the initially generated abstract information display page 702 may include a first object 705d. The first object 705d may include type, and abstract information related to or further characterizing information of the first notification information display page 705a. Further, the first object 705d may include link information or tag information on the first notification information display page 705a.

The electronic device 101 may generate the page indicator 702e on the abstract information display page 702. The page indicator 702e of the abstract information display page 702 may perform the same function as that of the page indicator 705e of the notification information display page 705a.

Figure 7B:
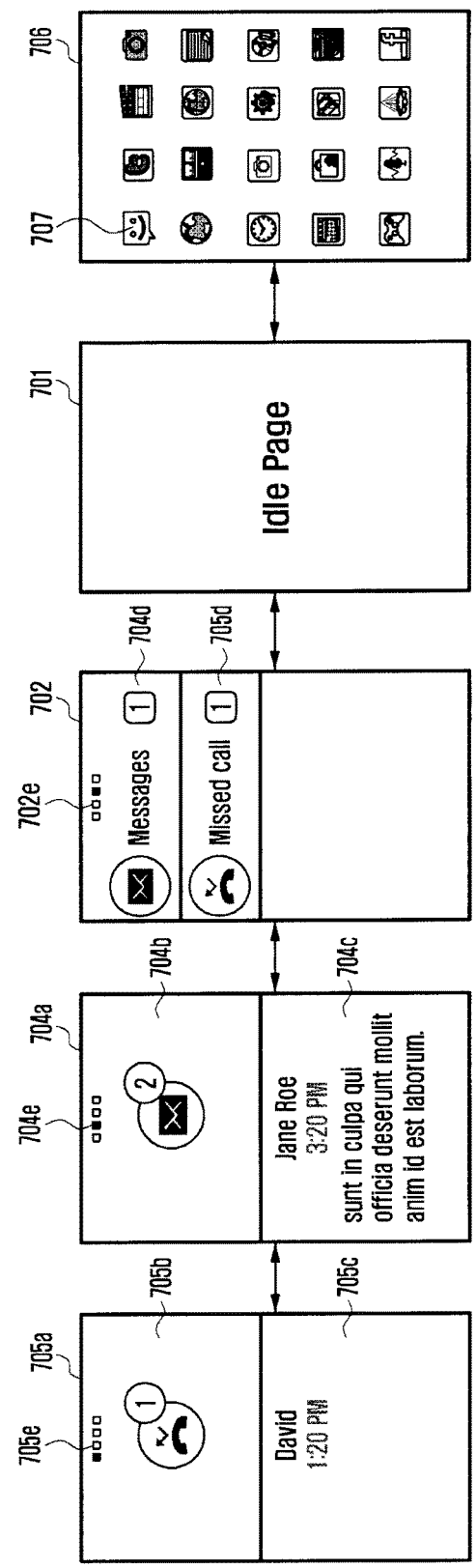

FIG. 7B illustrates an operation for generating a notification card and a page according to second notification information reception. The electronic device 101 may generate a second notification card 704c according to receival of the second notification information (such as during operation 660 if the condition of operation 630 is satisfied). The second notification information may include information related to a text message application. Since the second notification information relates to a different application relative to the initial application, the electronic device 101 may generate a second notification information display page 704a based on the second notification card 704c. According to an embodiment, the second notification information display page 704a may be generated to be closer to the abstract information display page 702 in comparison with the first notification information display page 705a. As illustrated in FIG. 7B, the second notification information display page 704a may be generated to be located to be right of the first notification information display page 705a and left of the abstract information display page 702. The electronic device 101 may generate the second category information 704b or the page indicator 704e. The page indicator 704e may be generated in a state where the page indicator 704e is included in the category information 704b. The electronic device 101 may add the second notification card 704c or the second category information 704b to the second notification information display page 704a. Since the text message is initially received in the second notification information display page 704a, the second notification information display page 704a may generate a UI item (number "1") indicating that the text message has arrived in the second category information 704b.

The electronic device 101 may change the content of the abstract information display page 702 simultaneously or sequentially with the second notification information display page 704a. Since the abstract information display page 702 has been already generated according to the generation of the first notification information display page 705a, the electronic device 101 does not generate or re-generate the abstract information display page 702. According to the generation of the second notification information display page 704a, the electronic device 101 may add a second object 704d to the existing abstract information display page 702. According to an embodiment, the electronic device 101 may add the object such that a newly received object is located at the uppermost portion. As illustrated in FIG. 7B, the second object 704d may be added to be displayed above the first object 705d. The second object 704d may include generation, type, and abstract information on the second notification information display page 704a. Further, the second object 704d may include link information or tag information on the second notification information display page 704a.

Figure 7C:
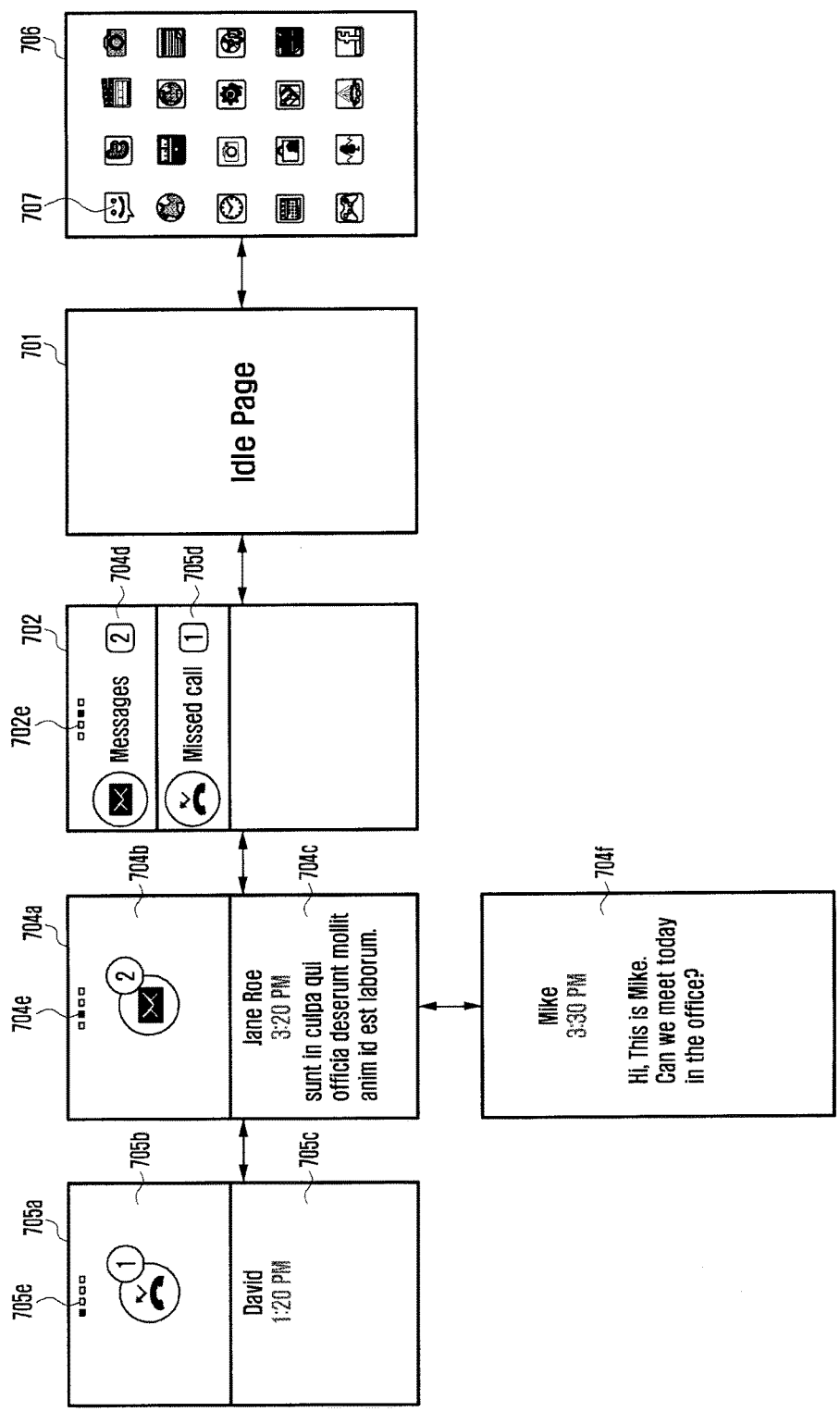

FIG. 7C illustrates an operation for generating a notification card according to a third reception of new notification information. The electronic device 101 may generate a third notification card 704f according to the third notification information reception. The third notification information may be notification information related to the text message application, which is of the same type as that of the second notification information. Since the third notification information is notification information for the same application as that of the second notification information, the electronic device 101 may alter the content in the previous second notification information display page 704a without generating a new and separate notification information display page. The electronic device 101 may add the third notification card 704f to the second notification information display page 704a. As illustrated in FIG. 7C, the third notification card 704f may be added to a portion below the second notification information display page 704a. However, the present disclosure is not limited thereto, and the third notification card 704f may be added to a portion above the second notification information display page 704a. The size or position of the third notification card 704f may be variously generated. The electronic device 101 may receive a user input signal to display the third notification card 704f.

The electronic device 101 may generate the second category information 704b. Since the second text message is received in the second notification information display page 704a, the second notification information display page 704a may change the UI item counted in the second category information 705b into a number "2".

The electronic device 101 may change the content of the abstract information display page 702 according to the third notification card 704f Because an additional notification information display page was not generated, the electronic device 101 may change the second object 704d in the abstract information display page 702 to indicate the presence of the new notification card. As illustrated in FIG. 7C, the number "1" which is displayed in the second object 704d may be changed into the number "2". The changed number "2" may indicate the presence of two notification cards included in the second notification information display page 704a.

Figure 7D:
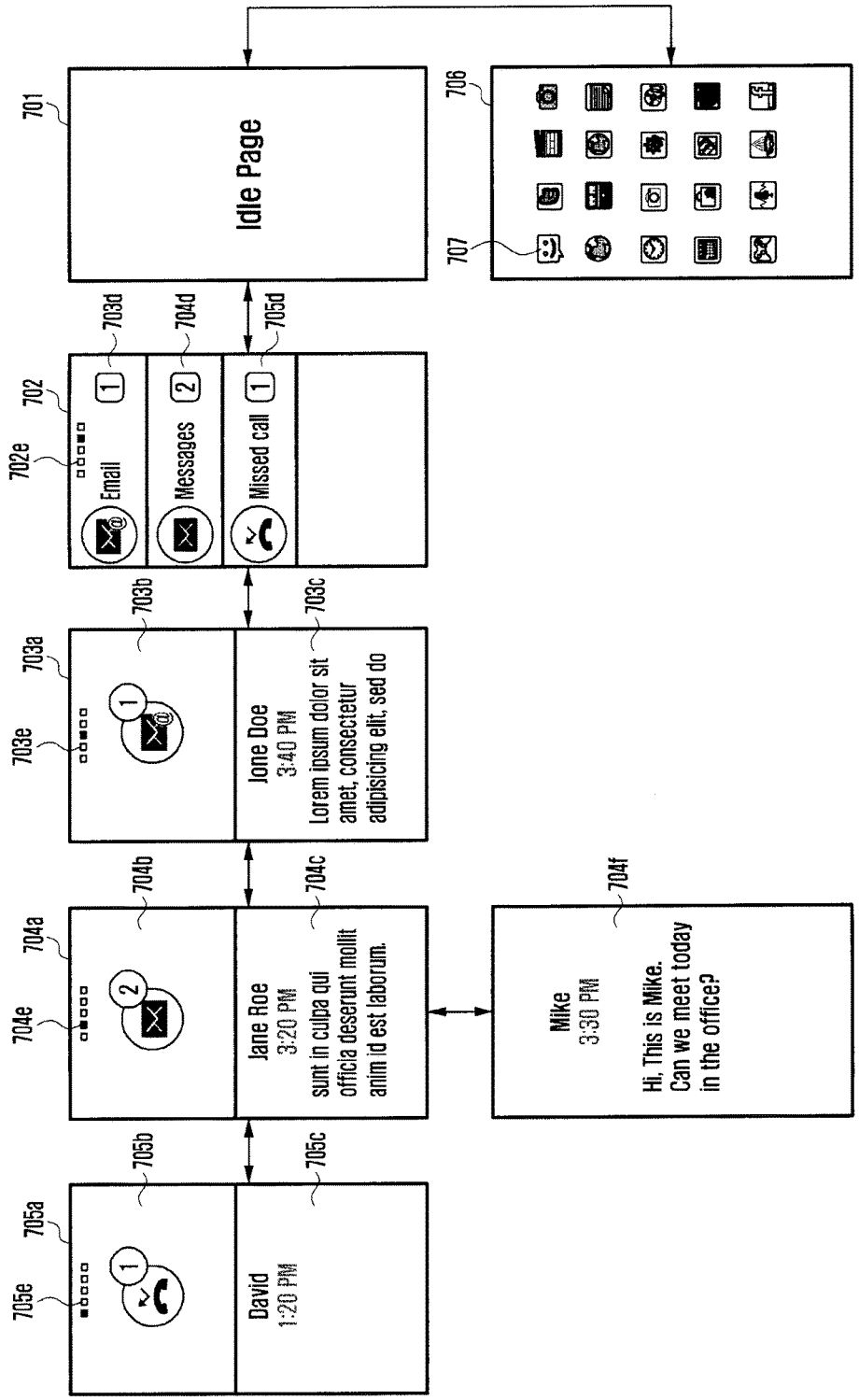

FIG. 7D illustrates an operation for generating a notification card and a page according to receival of a fourth notification information. The electronic device 101 may generate a fourth notification card 703c according to receival of a fourth notification information. The fourth notification information may be, for example, notification information for an email application (e.g., indicating a new e-mail). Since the fourth notification information is notification information of an application different from all initial (e.g., presently generated) notification information including the second notification information, and the third notification information (i.e., in other words, since the application of the fourth notification information does not correspond to any common application of other generated notification information), the electronic device 101 may generate a fourth notification information display page 703a based on the fourth notification card 703c. According to an embodiment, the fourth notification information display page 703a may be generated to be closer to the abstract information display page 702 relative to the first notification information display page 705a and the second notification information display page 704a. As illustrated in FIG. 7D, the fourth notification information display page 703a may be located to the right of the second notification information display page 704a and the left of the abstract information display page 702. The electronic device 101 may additionally generate the fourth category information 703b and/or the page indicator 703e. The page indicator 703e may be generated such that the page indicator 703e is included in the category information 703b. The electronic device 101 may add the fourth notification card 703c or the category information 703b to the fourth notification information display page 703a. Since the email is initially received in the fourth notification information display page 703a, the fourth notification information display page 703a may generate a UI item (number "1") indicating the presence of the particular email (e.g., that it has arrived and been received) in the fourth category information 703b.

The electronic device 101 may change the content of the abstract information display page 702 simultaneously or sequentially in accordance with the generation of the fourth notification information display page 703a. According to the generation of the fourth notification information display page 703a, the electronic device 101 may add a fourth object 703d to the abstract information display page 702. According to an embodiment, the electronic device 101 may add the object such that a newly received object is located at an uppermost portion of the page. As illustrated in FIG. 7D, the fourth object 703d may be added to a portion above the second object 704d. The fourth object 703d may include generation, type, and abstract information on the fourth notification information display page 703a. The fourth object 703d may include link information to the fourth notification information display page 703a.

Although the idle page 701 and the application menu page 706 are vertically oriented as depicted in FIG. 7D, the application menu page 706 may be located to the right of the idle page 701.

At least one of the notification information display page, the notification card, the abstract information display page, or the application menu page described in FIGS. 7A to 7D may be a screen displayed on the display 160. For example, the position, size, and content of each page illustrated in FIGS. 7A to 7D may be displayed on the display 160. Based on the position of each page illustrated in FIGS. 7A to 7D, the user may switch to a desired page through an event input such as a swipe on the display 160 of the electronic device 101. For example, as depicted in FIG. 7C, the electronic device 101 may display the idle page 701 on the display 160. When a swipe input for the idle page 701 is received, the electronic device 101 may display the abstract information display page 702 or the application menu page 706 according to the swipe input. A particular page of the pages illustrated in FIGS. 7A to 7D may be a screen displayed on the display 160, and the remaining pages may be hidden from display until switched to or selected through an input, such as a swipe, and then displayed on the display 160.

Figure 8:
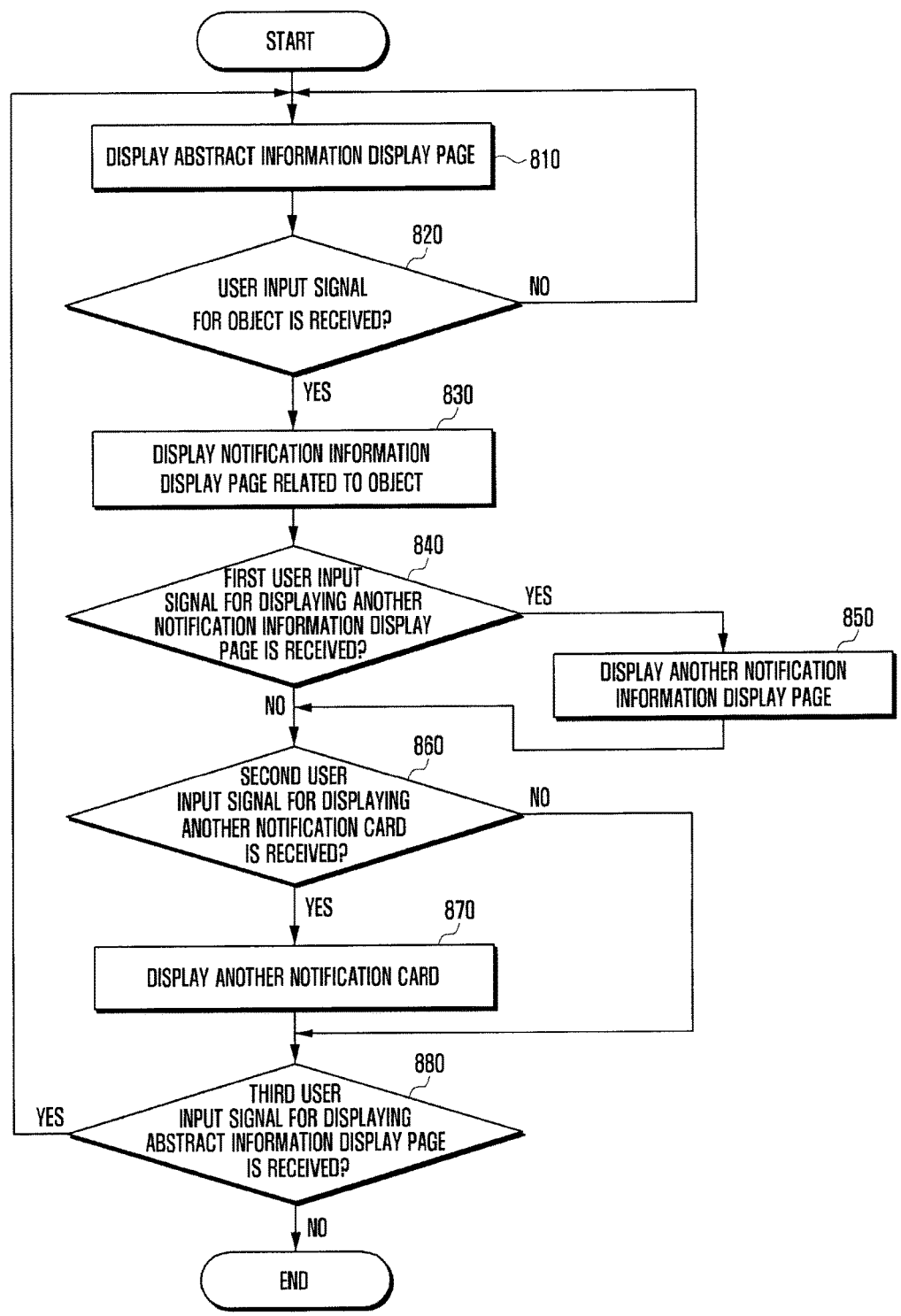
FIG. 8 is a flowchart illustrating an operation in which an electronic device displays a notification card and a page according to an embodiment of the present disclosure.

FIG. 8 is a flowchart illustrating an operation in which the electronic device 101 displays a notification card and a page, such as 702 according to an embodiment of the present disclosure.

According to an embodiment, in operation 810, the electronic device 101 may display an abstract information display page. For example, the notification display controller 127 may display the abstract information 702 display page on the display 160 automatically, or in response to a user input signal. The notification display controller 127 may control the size of the abstract information display page 702 based on the size of the display 160. The notification display controller 127 may display an idle page or the abstract information display page on the display when the system of the electronic device 101 is driven. According to an embodiment, the notification display controller 127 may display the abstract information display page 702 on the display 160 by default regardless of the generation of the notification information display page. To this end, the electronic device 101 may generate the abstract information display page before receiving the notification information 702. In this case, the generated abstract information display page may include an empty area without any object.

According to an embodiment, in operation 820, the electronic device 101 may determine whether a user input signal for the object is received. For example, the notification display controller 127 may determine whether the user input signal for the object is received on the abstract information display page. When the user input signal is not received, the electronic device 101 may display the abstract information display page in operation 810. Although not illustrated, the electronic device 101 may receive a particular input signal for ending the operation of the present disclosure, so as to end the operation of the present disclosure.

When the user input signal for the object is received, the electronic device 101 may display the notification information display page 705a related to the object in operation 830. The notification display controller 127 may recognize link information included in the object when the user input signal for the object is received. The notification display controller 127 may search for the notification information display page stored in the memory 130, based on the link information. The stored notification information display page 705a may be, for example, a notification information display page 705a mapped to the object based on the link information. When the notification information display page that is linked with the object is found or discovered, the notification display controller 127 may control the display 160 to display the discovered notification information display page 705a. Accordingly, the user may identify detailed information related to the object through the notification information display page without executing a separate application.

According to an embodiment, in operation 840, the electronic device 101 may determine whether a first user input signal for displaying another notification information display page 705a is received. The first user input signal may be, for example, an input based on various touches or gestures, such as a swipe operation. The notification display controller 127 may determine whether the user input signal for displaying another notification information display page is received on the abstract information display page. For example, the notification display controller 127 may display another notification information display page based on a swipe operation signal by the user. When the user input signal for displaying the other notification information display page is received, the electronic device 101 may display the other notification information display page in operation 850.

When the user input signal for displaying the other notification information display page is not received, the electronic device 101 may determine whether a second user input for displaying another notification card is received in operation 860. The second user input signal may be, for example, an input based on various touches or gestures, such as a swipe. According to an embodiment, the second user input signal may be an input signal having a direction or being of an input signal type different from that of the first user input signal. For example, when the first user input signal is a swipe in a left or right (e.g., horizontal) direction, the second user input signal may be a swipe input signal in an up or down (e.g., vertical) direction. Alternatively, when the first user input signal is a swipe input signal, the second user input signal may be a "touch and hold" input signal. The other notification card may be a plurality of notification cards included in one notification information display page. According to an embodiment, the notification display controller 127 may display a particular UI screen to allow the user to recognize that a plurality of notification cards exists on one notification information display page.

When the second user input signal for displaying the other notification card is received, the electronic device 101 may control the display 160 to display the other notification card included in the message in operation 870.

According to an embodiment, in operation 880, the electronic device 101 may determine whether a third user input signal for displaying an abstract information display page is received. The third user input signal (or signals) may be, for example, a sequence of successive touch inputs. The notification display controller 127 may receive the third user input signal for displaying the abstract information display page from a particular notification information display page.

When the third user input signal for displaying the abstract information display page is received, the electronic device 101 may display the abstract information display page again in operation 810.

Figure 9A:
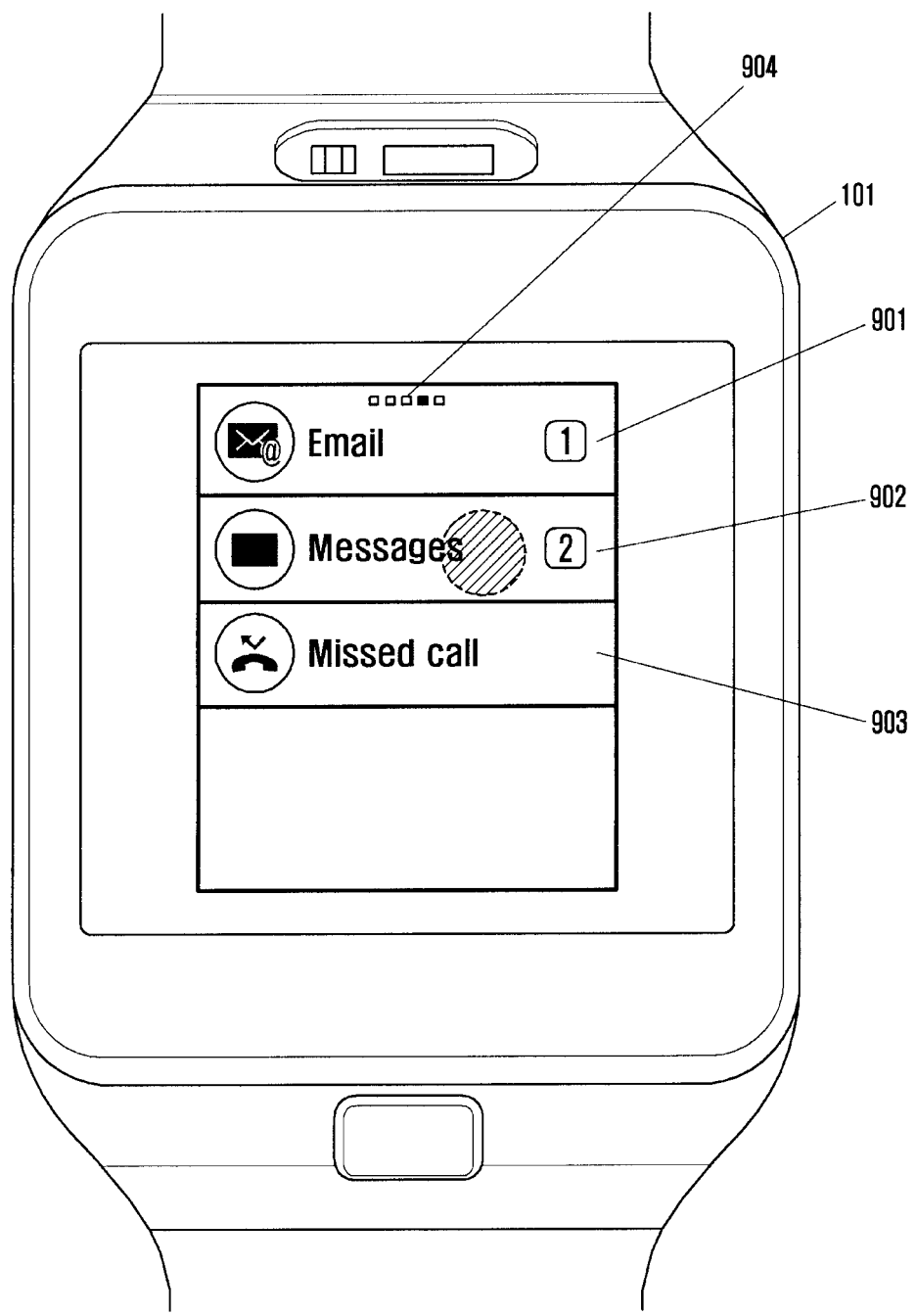
FIG. 9A, FIG. 9B and FIG. 9C illustrate the operation of FIG. 8.
Figure 9B:
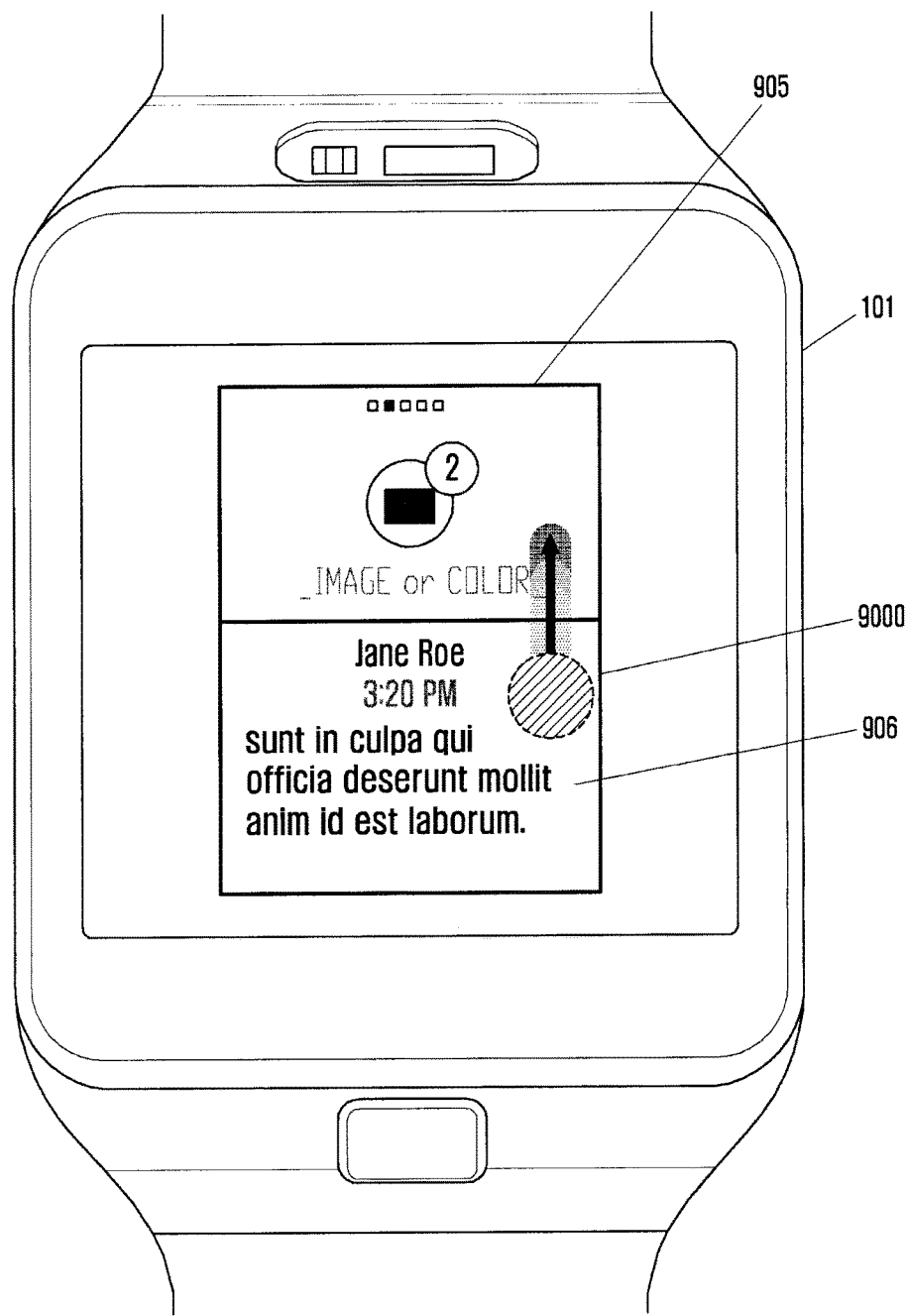
Figure 9C:
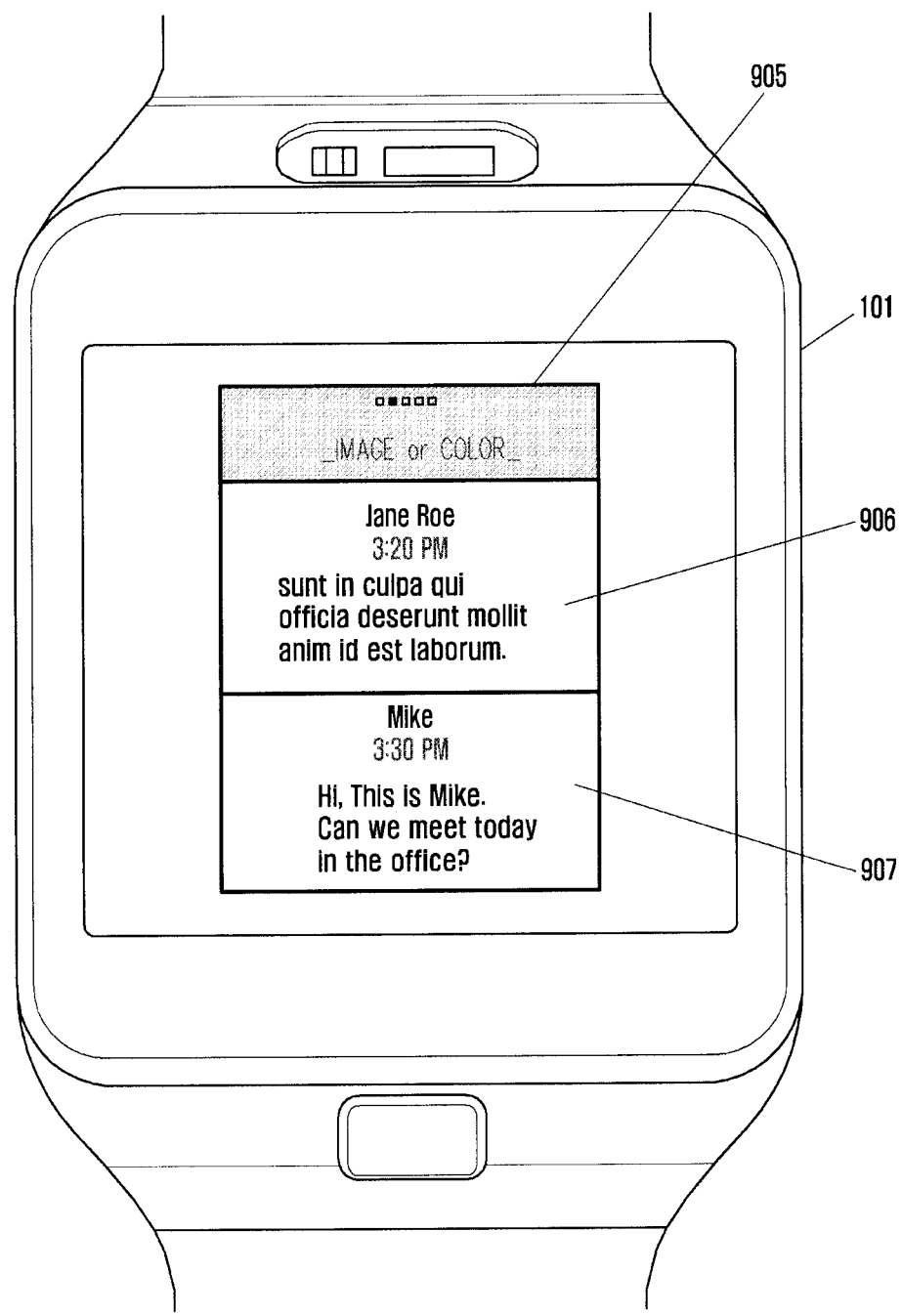

FIGS. 9A to 9C may help illustrate examples of the operation described above with respect to FIG. 8.

FIGS. 9A to 9C illustrate a wearable device displaying a notification information display page and/or an abstract information display page, according to an embodiment of the present disclosure. FIG. 9A illustrates that the electronic device 101 (e.g., a smartwatch) may display an abstract information display page (operation 810) and receive an input signal selecting a particular object (operation 820) included in the displayed page. It this example, five pages may currently be generated through a page indicator 904. An idle page may be generated or disposed to the right of the illustrated abstract information display page, and three notification information display pages may be generated or otherwise disposed to the left. Three objects 901, 902, and 903 may be displayed as part of the currently displayed abstract information display page. Each of the objects 901, 902, and 903 may include link information allowing link to the corresponding notification information display page upon selection. The electronic device 101 may receive a touch input signal selecting, for example, the object 902 from the user.

FIG. 9B illustrates an operation (operation 830) for displaying the abstract notification information display page related to the object 902 according to the received user input signal. The electronic device 101 may receive or retrieve hyperlink information or tag information included in the selected object 902, and display a corresponding notification information display page 905. The notification information display page 905 may be a secondly located page. The notification information display page 905 may include a notification card 906. The notification information display page 905 may further include a sender, time, and content of the text message.

The electronic device 101 may display the notification information display page 905 by "jumping from" the abstract information display page. That is, for example, when the electronic device 101 receives the user input signal for the object 902 on the abstract information display page (operation 820), the electronic device 101 may directly and/or immediately display the notification information display page 905 without displaying any another notification information display page as, for example, a transition. According to another contrasting embodiment, the electronic device 101 may seamlessly transition to displaying the notification information display page 905 while sequentially displaying other intervening notification information display pages. For example, when the electronic device 101 receives the user input signal for the object 902 on the abstract information display page, the electronic device 101 may transition to displaying the notification information display page 905 (operation 830) on the display, briefly displaying an intervening third notification information display page.

The notification information display page 905 may include, for example, three text message notification cards accessible within the page. The electronic device 101 may receive an input signal for switching a display of a notification card from the user (operation 840). For example, as illustrated in FIG. 9B, the user may input a "touch and drag" or a swipe touch input 9000. When the electronic device 101 recognizes the touch input 9000, the electronic device 101 may respond by switching to display of another notification card.

FIG. 9C illustrates a notification card 906 and another notification card 907 (operation 850) included in the notification information display page 905, displayed in response to the user input signal of FIG. 9B (i.e., touch input 9000). The electronic device 101 may display the other notification card 907 on the display 160 in response to the user input signal. The other notification card 907 may include a sender, a content, and time information which are different from those of the notification card 906. Although not illustrated, the electronic device 101 may display still another notification card (operation 870) through reception of an additional input signal (operation 860).

According to an embodiment, the electronic device 101 may receive a particular user input signal while displaying a current notification information display page 905. The particular user input signal may be a requesting display of the abstract information display page (operation 880). For example, when the screen displayed on the display 160 corresponds to a first or second page, the user may input a particular input signal to return to the abstract information display page. The particular input signal may be configured as various types of touch inputs, such as successive touch inputs or a double tap touch input. When the electronic device 101 receives the signal for displaying the abstract information display page again, the electronic device 101 may display the abstract information display page on the display 160. For example, the electronic device 101 may seamlessly transition to the abstract information display page by sequentially displaying intervening notification information display pages before finally arriving at display of the abstract information display page. Accordingly, the electronic device 101 may receive one input signal instead of a plurality of input signals for displaying the abstract information display page when displaying a particular notification information display page. When the electronic device 101 receives a user input signal for displaying the abstract information display page in FIG. 9C, the electronic device 101 may redisplay the abstract information display page of FIG. 9A.

The display of the abstract information page and the notification information page(s) can allow the user to conveniently navigate through numerous notifications on a relatively small screen such as a wearable electronic device 101.

FIG. 10 is a flowchart illustrating an operation in which the electronic device 101 executes an application through a notification card according to an embodiment of the present disclosure. With respect to the following description of FIG. 10, subject matter with respect to FIG. 5 that has already been described above may be omitted for the sake of brevity. As noted above, in certain embodiments, the electronic device 101 can cause notification information pages and an abstract information page to be displayed either on the electronic device 101, or another electronic device such as electronic device 102, 104.

According to an embodiment, in operation 1010, the electronic device 101 may receive notification information and generate a notification card based on the notification information. For example, the notification information receiver 121 may receive notification information corresponding to various applications. The notification card generator 123 may generate the notification card based on the notification information.

According to an embodiment, in operation 1020, the electronic device 101 may generate a notification information display page including the notification card. For example, the page generator 125 may generate the notification information display page based on the notification card.

According to an embodiment, in operation 1030, the electronic device 101 may generate the abstract information display page including an object. The object may be associated with at least one of the notification card or the notification information display page.

According to an embodiment, in operation 1040, the electronic device 101 may display the notification information display page, and receive a user input for the notification card. The user input signal for the notification card may be a signal for executing an application related to the corresponding notification card. For example, when the electronic device 101 receives the user input signal for the notification card on the notification information display page, the electronic device 101 may execute the application related to the corresponding notification card.

According to an embodiment, in operation 1050, the processor 120 may determine whether the electronic device 101 is in a stand alone mode. The stand alone mode refers to a state where the electronic device 101 operates alone without cooperation or communication with another external terminal for the purposes of executing applications related to the notifications. Therefore, the electronic device 101 may be determined to be operating in the stand alone mode when the electronic device 101 has no communication connection with any external terminal.

When the electronic device 101 is in the stand alone mode, the electronic device 101 may execute a corresponding application in operation 1060 in response to the user input signal. For example, the electronic device 101 may execute an embedded or installed application.

When the electronic device 101 is not in the stand alone mode, the electronic device 101 may instead transmit an application execution control signal to another electronic device, via a communication connection between the external electronic device and the electronic device 101. For example, the electronic device 101 may transmit a control signal to the external terminal to execute an application related to the notification card. The user may thus execute the related application through the external terminal by inputting the signal for the notification card.

FIG. 11 is a flowchart illustrating an operation in which the electronic device 101 receives notification information according to an embodiment of the present disclosure. With respect to the following description of FIG. 11, the subject matter that has already been described with respect to FIG. 5 may be omitted for the sake of brevity.

According to an embodiment, in operation 1110, the processor 120 may determine whether the electronic device 101 is in a stand alone mode.

When the electronic device 101 is in the stand alone mode, the electronic device 101 may receive notification information of an application in operation 1120. For example, the electronic device 101 may receive the notification information of the application, when the electronic device is operating independently without a communication connection with an external terminal.

When the electronic device 101 is not in the stand alone mode, the electronic device 101 may receive notification information from another electronic device having a communication connection with the electronic device 101, in operation 1130. For example, the electronic device 101 may receive the notification information from the terminal, which includes the communication connection with the electronic device 101.

According to an embodiment, in operation 1140, the electronic device 101 may generate a notification card including at least some of the notification information.

According to an embodiment, in operation 1150, the electronic device 101 may generate a notification information display page including the notification card.

According to an embodiment, in operation 1160, the electronic device 101 may generate an abstract information display page including an object related to at least one of the notification card or the notification information display page.

Figure 12:
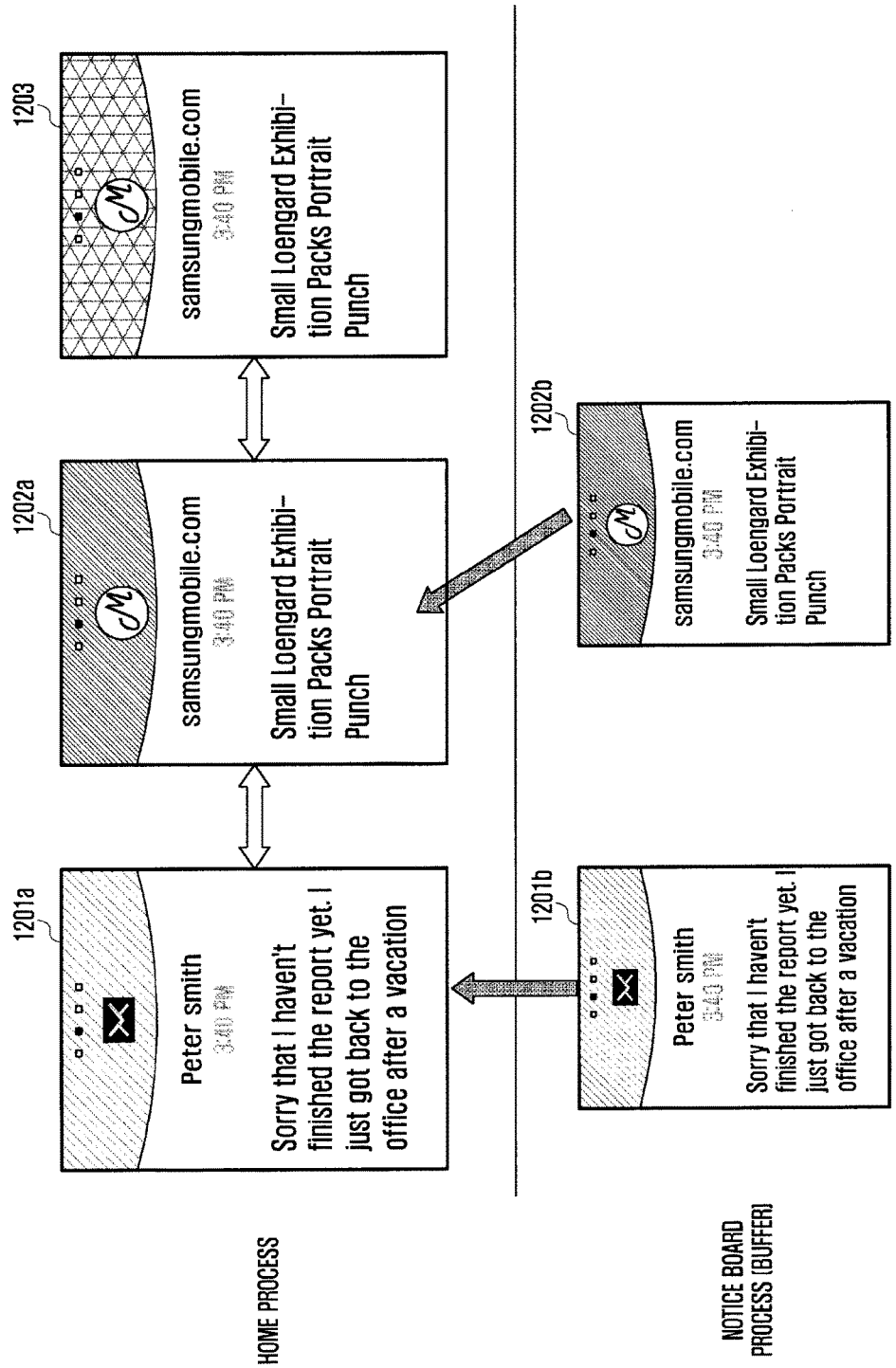
FIG. 12 illustrates an example embodiment in which an electronic device generates a notification card and a page according to an embodiment of the present disclosure.

FIG. 12 illustrates an example embodiment in which the electronic device 101 generates a notification card and a page according to an embodiment of the present disclosure, including a screen in which a page is generated by a "home process" (e.g., a root or core operating system of the electronic device 101) and a "notice board process."

The electronic device 101 may integrate generation and display of notification information display pages and abstract information display pages into a core or root home process to generate the home process. In this case, the notice board process may not operate. The electronic device 101 may combine an idle page, a notification information display page, and an abstract information display page into a home process to generate the home process. When the pages are combined into the home process, the electronic device 101 may not execute a separate application for displaying the notification information display page or the abstract information display page. For example, the electronic device 101 may execute the home screen (e.g., the idle page), the notification information display page, and the abstract information display page as a home application when power is supplied to the electronic device 101 for initial start-up. The home screen (e.g., the idle page), the notification information display page, and the abstract information display page may be included as a home application. The electronic device 101 may generate pages 1201a, 1202a, and 1203a through the home process.

According to another embodiment, the electronic device 101 may generate the notification information display page or the abstract information display page by using the home process and the notice board process. The notice board process may be an application separate from the home process, which serves as a buffer for generating the various pages. The electronic device 101 may execute the home process and the notice board process to generate the notification information display page and/or the abstract information display page. The electronic device 101 may generate the pages 1201a and 1202b via the notice board process, and then output or otherwise display the generated pages through the home process. According to the present embodiment, the notice board process may transmit a buffer type page to the home process using, for example, socket communication.

A method of providing notification by the electronic device 101 according to an embodiment of the present disclosure may include: receiving notification information on a first application; generating a first notification information display page including at least some of the notification information; generating a first object related to the notification information and an abstract information display page including the first object; displaying the abstract information display page on a display; and displaying the first notification information display page based on a user input signal for the first object, where the generating and displaying of the abstract information display page and the first notification information display page are performed based on an equal application or home application.

The method according to an embodiment of the present disclosure may further include additionally receiving notification information on a second application different from the first application, where the displaying of the abstract information display page on the display may include adding a second object related to the notification information on the second application to the abstract information display page and displaying the abstract information display page.

The method according to an embodiment may further include generating a second notification information display page including at least some of the notification information related to the second application; receiving a user input signal for the second object on the abstract information display page; and displaying the second notification information display page on the display based on the user input signal for the second object, where the generating and displaying of the first notification information display page, the second notification information display page, and the abstract information display page are performed based on an equal application or home application.

In the method according to an embodiment of the present disclosure, the displaying of the first object and the second object on the abstract information display page may include displaying each of the first object and the second object in a particular position of a display screen based on a predetermined condition.

The method according to an embodiment of the present disclosure may further include: receiving a user input signal for displaying the abstract information display page on the first notification information display page or the second notification information display page; and displaying the abstract information display page on the display based on the user input signal for displaying the abstract information display page.

The method according to an embodiment of the present disclosure may further include: additionally receiving one or more pieces of notification information of the first application; adding the one or more pieces of additionally received notification information to the first notification information display page; and further displaying the one or more pieces of additionally received notification information on the first notification information display page based on a predetermined user input signal.

In the method according to an embodiment of the present disclosure, at least some of the notification information may be displayed as an image screen in a particular area of the first notification information display page, and the method may further include differently displaying the numbers or sizes of image screens corresponding to the one or more pieces of notification information on the first notification information display page based on the user input signal.

In the method according to an embodiment of the present disclosure, the user input signal may include a pinch zoom input signal.

The method according to an embodiment of the present disclosure may further include: receiving a user input signal for executing the first application on the first notification information display page; and executing the first application based on the user input signal.

The method according to an embodiment of the present disclosure may further include: determining whether the electronic device 101 is in a stand alone mode, where the executing of the first application may include: executing the first application when the electronic device 101 is in the stand alone mode; or transmitting a first application execution control signal to another electronic device 102 or 104 connected to the electronic device 101 when the electronic device 101 is not in the stand alone mode.

The method according to an embodiment of the present disclosure may further include: determining whether the electronic device 101 is in a stand alone mode, where the receiving of the notification information on the first application may include: receiving the notification information on the first application embedded in the electronic device when the electronic device 101 is in the stand alone mode; or receiving notification information from another electronic device 102 or 104 connected to the electronic device 101 when the electronic device 101 is not in the stand alone mode.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), or programmable-logic device, which have been known or are to be developed.

As described above, part of the method (e.g., operations) or system (e.g., modules or functions) according to various embodiments can be implemented with command instructions that can be conducted via various types of computers and stored in computer-readable storage media, as types of programming modules, for example. One or more processors (e.g., processor 120) can execute commend instructions, thereby performing the functions. An example of the computer-readable storage media may be memory 130.

Examples of computer-readable media include: magnetic media, such as hard disks, floppy disks, and magnetic tape; optical media such as CD-ROM disks and DVDs; magneto-optical media, such as floptical disks; and hardware devices that are specially configured to store and perform program instructions (programming modules), such as read-only memory (ROM), random access memory (RAM), flash memory, etc. Examples of program instructions include machine code, such as produced by a compiler, and files containing higher level code that may be executed by the computer using an interpreter. The described hardware devices may be configured to act as one or more software modules in order to perform the operations and methods described above, or vice versa.

Modules or programming modules according to various embodiments may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

Although example embodiments of the disclosure have been described in detail above, it should be understood that many variations and modifications of the basic inventive concept herein described, which may be apparent to those skilled in the art, will still fall within the example embodiments of the disclosure as defined in the appended claims.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. A portable communication device comprising:

communication circuitry;

a touch screen; and a processor adapted to:

displaying a background screen;

receive, using the communication circuitry, first information related to a first application;

generate a first notification based at least in part on the first information;

receive, using the communication circuitry, second information related to a second application;

generate a second notification based at least in part on the second information;

display, using the touch screen, a page including at least part of the first notification and at least part of the second notification, in response to a gesture received with respect to the background screen after displaying the background screen;

identify an input received with respect to the at least part of the first notification or the at least part of the second notification displayed as part of the page;

display, using the touch screen, at least part of the first information based at least in part on a determination that the input is received with respect to the at least part of the first notification; and display, using the touch screen, at least part of the second information based at least in part on a determination that the input is received with respect to the at least part of the second notification.

2. The portable communication device of claim 1, wherein the processor is adapted to:

perform the receiving of the first information based at least in part on a determination that a communication connection is established between the portable communication device and an external electronic device from which the first information is transmitted.

3. The portable communication device of claim 1, wherein the processor is adapted to:

perform the generating of the first notification after the receiving of the first information; and perform the generating of the second notification after the receiving of the second information.

4. A portable communication device comprising:
communication circuitry;
a touch screen; and
a processor adapted to:
- receive, using the communication circuitry, first information related to a first application;
- generate a first notification based at least in part on the first information;
- receive, using the communication circuitry, second information related to a second application;
- generate a second notification based at least in part on the second information;
- display, using the touch screen, a page including at least part of the first notification and at least part of the second notification;
- identify an input received with respect to the at least part of the first notification or the at least part of the second notification displayed as part of the page;
- display, using the touch screen, at least part of the first information based at least in part on a determination that the input is received with respect to the at least part of the first notification;
- display, using the touch screen, at least part of the second information based at least in part on a determination that the input is received with respect to the at least part of the second notification; and
- generate the first notification as at least part of a second page, and the second notification as at least part of a third page.

5. The portable communication device of claim 1, wherein the processor is adapted to:
- as at least part of the displaying of the page, display a first graphical representation indicative of the first application in relation with the at least part of the first notification, and a second graphical representation indicative of the second application in relation with the at least part of the second notification.

6. The portable communication device of claim 1, wherein the processor is adapted to:
- display an indicator using the touch screen based at least in part on the receiving of the first information or the second information.

7. The portable communication device of claim 1, wherein the processor is adapted to:
- receive another input with respect to the at least part of the first information displayed using the touch screen; and
- execute the first application based at least in part on the receiving of the other input.

8. The portable communication device of claim 1, wherein the processor is adapted to:
- generate the page, the first notification, and the second notification using a same application.

9. A portable communication device comprising:
communication circuitry;
a touch screen; and
a processor adapted to:
- receive, using the communication circuitry, first information related to a first application;
- generate a first notification based at least in part on the first information;
- receive, using the communication circuitry, second information related to a second application;
- generate a second notification based at least in part on the second information;
- display, using the touch screen, a page including at least part of the first notification and at least part of the second notification;
- identify an input received with respect to the at least part of the first notification or the at least part of the second notification displayed as part of the page;
- display, using the touch screen, at least part of the first information based at least in part on a determination that the input is received with respect to the at least part of the first notification;
- display, using the touch screen, at least part of the second information based at least in part on a determination that the input is received with respect to the at least part of the second notification; and
- as at least part of the displaying of a corresponding one of the at least part of the first information and the at least part of the second information, control the touch screen such that the page is to be switched to another page including the corresponding one of the at least part of the first information and the at least part of the second information.

10. A portable communication device comprising:
communication circuitry;
a touch screen; and
a processor adapted to:
- displaying a background screen;
- display, using the touch screen, a first notification and a second notification concurrently, the first notification indicative of at least part of first information received at the portable communication device with respect to a first application and the second notification indicative of at least part of second information received at the portable communication device with respect to a second application, in response to a gesture received with respect to the background screen after displaying the background screen;
- receive an input to select a notification from the first notification and the second notification displayed concurrently; and
- display, using the touch screen, the at least part of the first information or the at least part of the second information corresponding to the selected notification in response to the input.

11. The portable communication device of claim 10, wherein the communication circuitry is adapted to support a short-range communication including bluetooth or wi-fi, and wherein the processor is adapted to:
- receive a corresponding one of the first information and the second information via the short-range communication established between the portable communication device and an external electronic device using the communication circuitry.

12. The portable communication device of claim 10, wherein the processor is adapted to:
- generate the first notification after the first information is received at the portable communication device; and
- generate the second notification after the second information is received at the portable communication device.

13. The portable communication device of claim 10, wherein the processor is adapted to:
- display a first graphical representation indicative of the first application or a second graphical representation indicative of the second application as at least part of the displaying of a corresponding one of the at least part of the first information and the at least part of the second information.

14. The portable communication device of claim 10, wherein the processor is adapted to:
- display the page, the first information, and the second information using a same application.

15. The portable communication device of claim 10, wherein the processor is adapted to:
  display, using the touch screen, an indicator indicating that a corresponding one of the first information and the second information is received at the portable communication device.

16. A portable communication device comprising:
  communication circuitry;
  a touch screen; and
  a processor adapted to:
    receive, using the communication circuitry, first information related to a first application;
    generate a first page based at least in part on the first information;
    receive, using the communication circuitry, second information related to a second application;
    generate a second page based at least in part on the second information;
    display, using the touch screen, a third page including at least part of the first page and at least part of the second page;
    identify an input received with respect to the at least part of the first page or the at least part of the second page displayed as part of the third page;
    replace the third page displayed via the touch screen with the first page based at least in part on a determination that the input is received with respect to the at least part of the first page; and
    replace the third page displayed via the touch screen with the second page based at least in part on a determination that the input is received with respect to the at least part of the second page.

17. The portable communication device of claim 16, wherein the processor is adapted to:
  generate the first page such that a first image or a first text indicative of the first application is associated with the at least part of the first page, and that a second image or a second text indicative of the second application is associated with the at least part of the second page.

18. The portable communication device of claim 16, wherein the processor is adapted to:
  generate the first and second pages such that the first page has a first size and the second page has a second size.

19. The portable communication device of claim 16, wherein the processor is adapted to:
  display the first page, the second page, and the third page using a same application.

* * * * *